(12) United States Patent
Chen et al.

(10) Patent No.: US 12,170,045 B2
(45) Date of Patent: *Dec. 17, 2024

(54) ALWAYS-ON-DISPLAY METHOD AND ELECTRONIC DEVICE

(71) Applicant: HONOR DEVICE CO., LTD., Shenzhen (CN)

(72) Inventors: Wenjie Chen, Shenzhen (CN); Liwei Huang, Shenzhen (CN); Kai Qian, Shenzhen (CN); Yan Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,583

(22) Filed: Aug. 29, 2023

(65) Prior Publication Data

US 2024/0005830 A1    Jan. 4, 2024

Related U.S. Application Data

(63) Continuation of application No. 17/801,478, filed as application No. PCT/CN2021/114607 on Aug. 25, 2021, now Pat. No. 11,823,603.

(30) Foreign Application Priority Data

Sep. 3, 2020    (CN) .......................... 202010916054.8

(51) Int. Cl.
    *G09G 3/20*    (2006.01)
(52) U.S. Cl.
    CPC ....... *G09G 3/20* (2013.01); *G09G 2320/0626* (2013.01); *G09G 2330/022* (2013.01)

(58) Field of Classification Search
    None
    See application file for complete search history.

(56) References Cited

U.S. PATENT DOCUMENTS

| 9,916,816 B2 | 3/2018 | Zhu et al. |
| 10,310,583 B2 | 6/2019 | Timm et al. |
| 11,307,733 B2 | 4/2022 | Luo et al. |

(Continued)

FOREIGN PATENT DOCUMENTS

| CN | 104662600 A | 5/2015 |
| CN | 106527896 A | 3/2017 |

(Continued)

*Primary Examiner* — Ifedayo B Iluyomade
(74) *Attorney, Agent, or Firm* — WOMBLE BOND DICKINSON (US) LLP

(57) ABSTRACT

Embodiments of this application provide an always-on-display method and an electronic device. The method includes: displaying, by an electronic device, an always-on-display screen, where the always-on-display screen includes a first image of a first display object; in response to detecting by the electronic device that an external object satisfies a first preset condition, displaying, by the electronic device, a second image of a second display object, where the second image is different from the first image. In the embodiments of this application, the always-on-display screen displayed by the electronic device can change according to the external object. When the external object satisfies a preset condition, a corresponding image or motion video is displayed, so that the always-on-display screen can be flexibly displayed.

20 Claims, 20 Drawing Sheets

(56) References Cited

U.S. PATENT DOCUMENTS

| | | | |
|---|---|---|---|
| 11,823,603 B2* | 11/2023 | Chen | G06F 3/0481 |
| 2008/0134063 A1 | 6/2008 | Volach | |
| 2011/0109538 A1 | 5/2011 | Kerr et al. | |
| 2013/0342672 A1 | 12/2013 | Gray et al. | |
| 2015/0242166 A1 | 8/2015 | Shimpei et al. | |
| 2016/0055827 A1 | 2/2016 | Hamada | |
| 2016/0077606 A1 | 3/2016 | Hyun et al. | |
| 2017/0339347 A1 | 11/2017 | Cho et al. | |
| 2018/0121060 A1 | 5/2018 | Jeong et al. | |
| 2018/0367656 A1 | 12/2018 | Kim et al. | |
| 2019/0121537 A1 | 4/2019 | Lin et al. | |
| 2019/0129499 A1 | 5/2019 | Li | |
| 2021/0181923 A1 | 6/2021 | Luo et al. | |
| 2022/0208064 A1 | 6/2022 | Huang et al. | |

FOREIGN PATENT DOCUMENTS

| | | |
|---|---|---|
| CN | 106534515 A | 3/2017 |
| CN | 107861620 A | 3/2018 |
| CN | 108509037 A | 9/2018 |
| CN | 109343759 A | 2/2019 |
| CN | 109361593 A | 2/2019 |
| CN | 109557999 A | 4/2019 |
| CN | 110045936 A | 7/2019 |
| CN | 110149442 A | 8/2019 |
| CN | 110417986 A | 11/2019 |
| CN | 110658906 A | 1/2020 |
| CN | 110795187 A | 2/2020 |
| CN | 111061360 A | 4/2020 |
| CN | 111580904 A | 8/2020 |
| CN | 112684969 A | 4/2021 |
| CN | 113411445 A | 9/2021 |
| JP | 2007293631 A | 11/2007 |
| JP | 2010067104 A | 3/2010 |
| JP | 2017120324 A | 7/2017 |
| JP | 2022528931 A | 6/2022 |
| RU | 2642427 C2 | 1/2018 |
| RU | 2643444 C2 | 2/2018 |
| WO | 2012043827 A1 | 4/2012 |

* cited by examiner

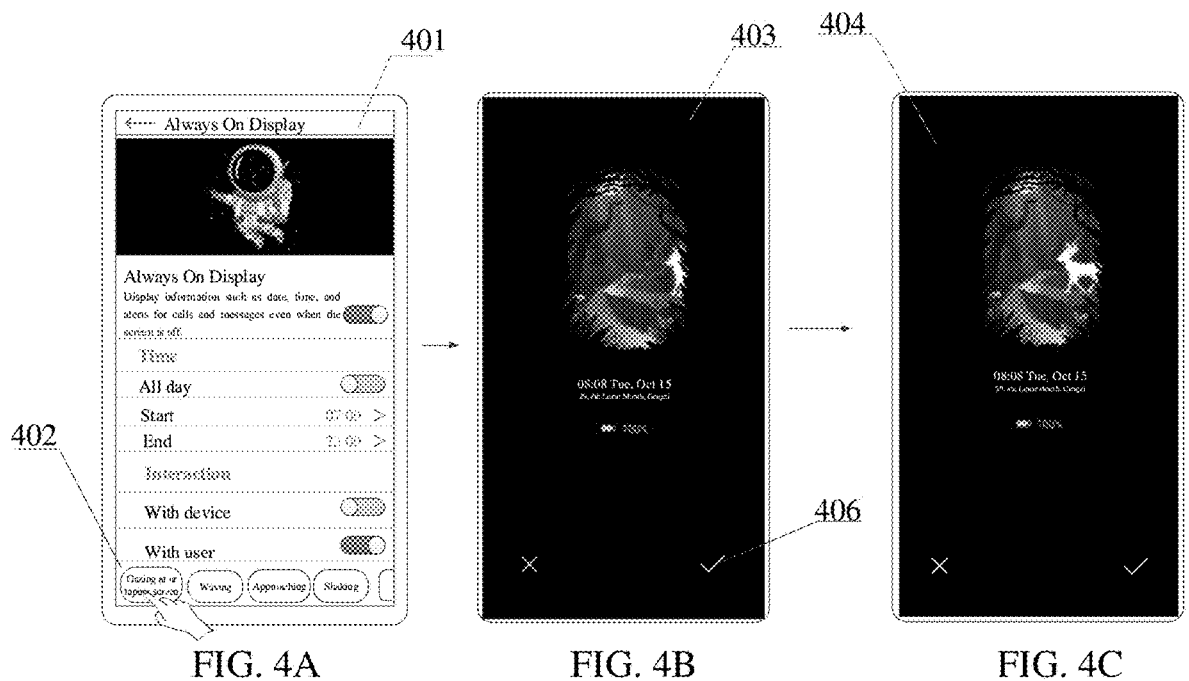
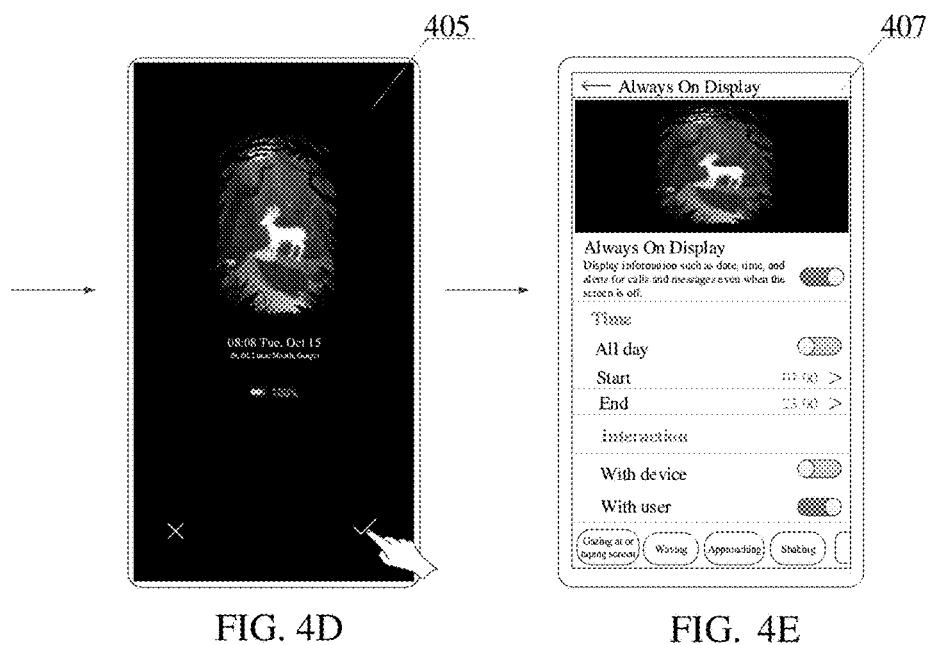
FIG. 4A  FIG. 4B  FIG. 4C
FIG. 4D  FIG. 4E

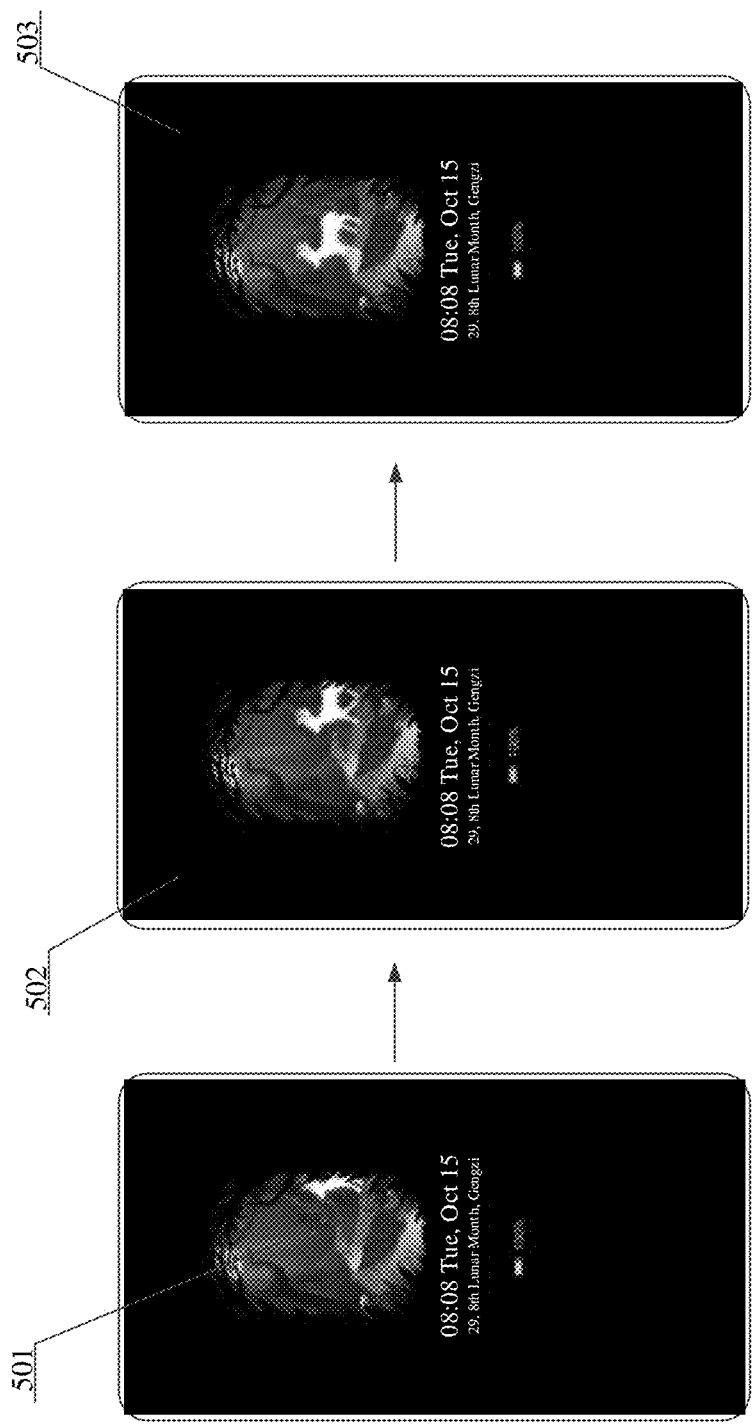

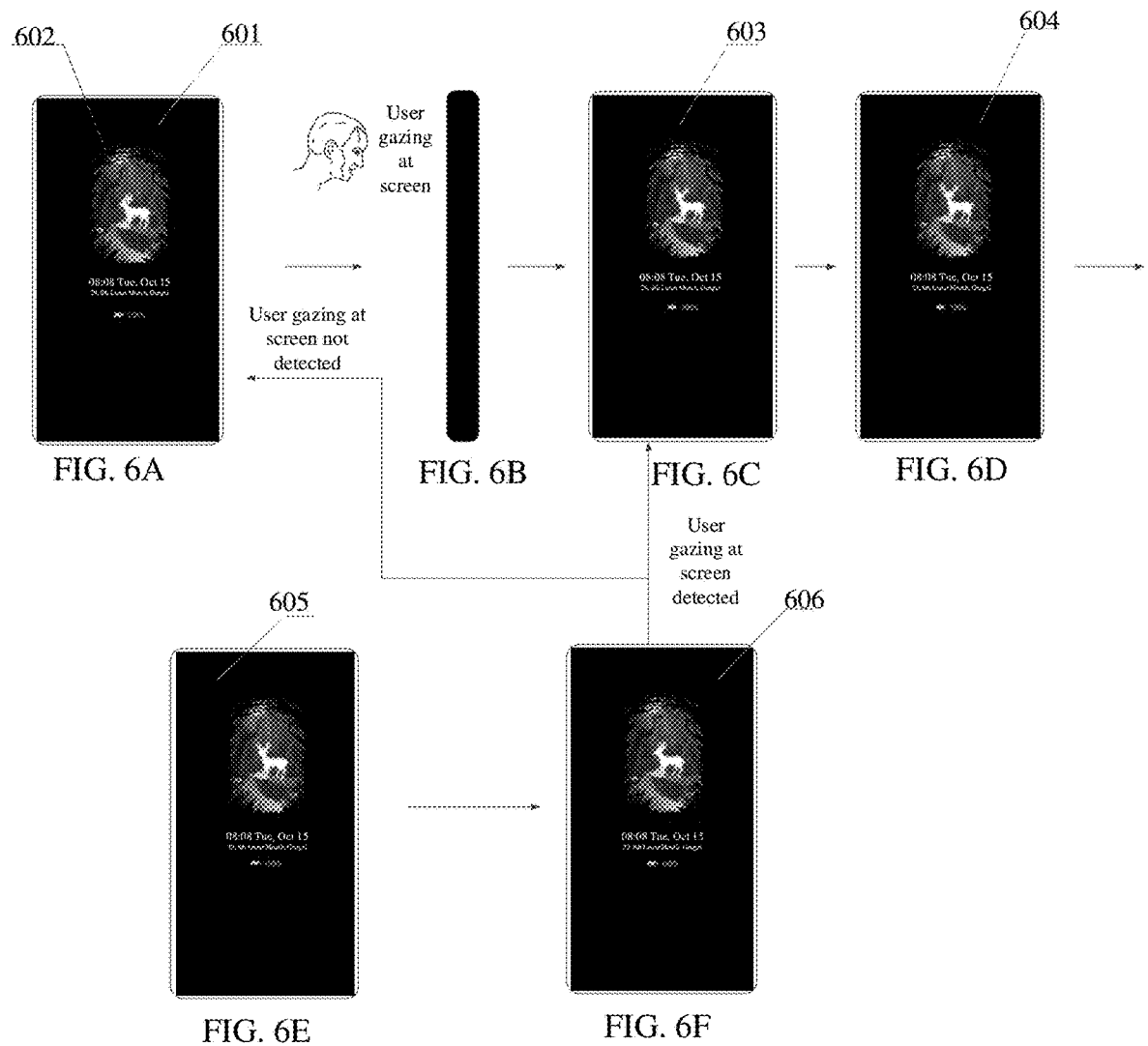

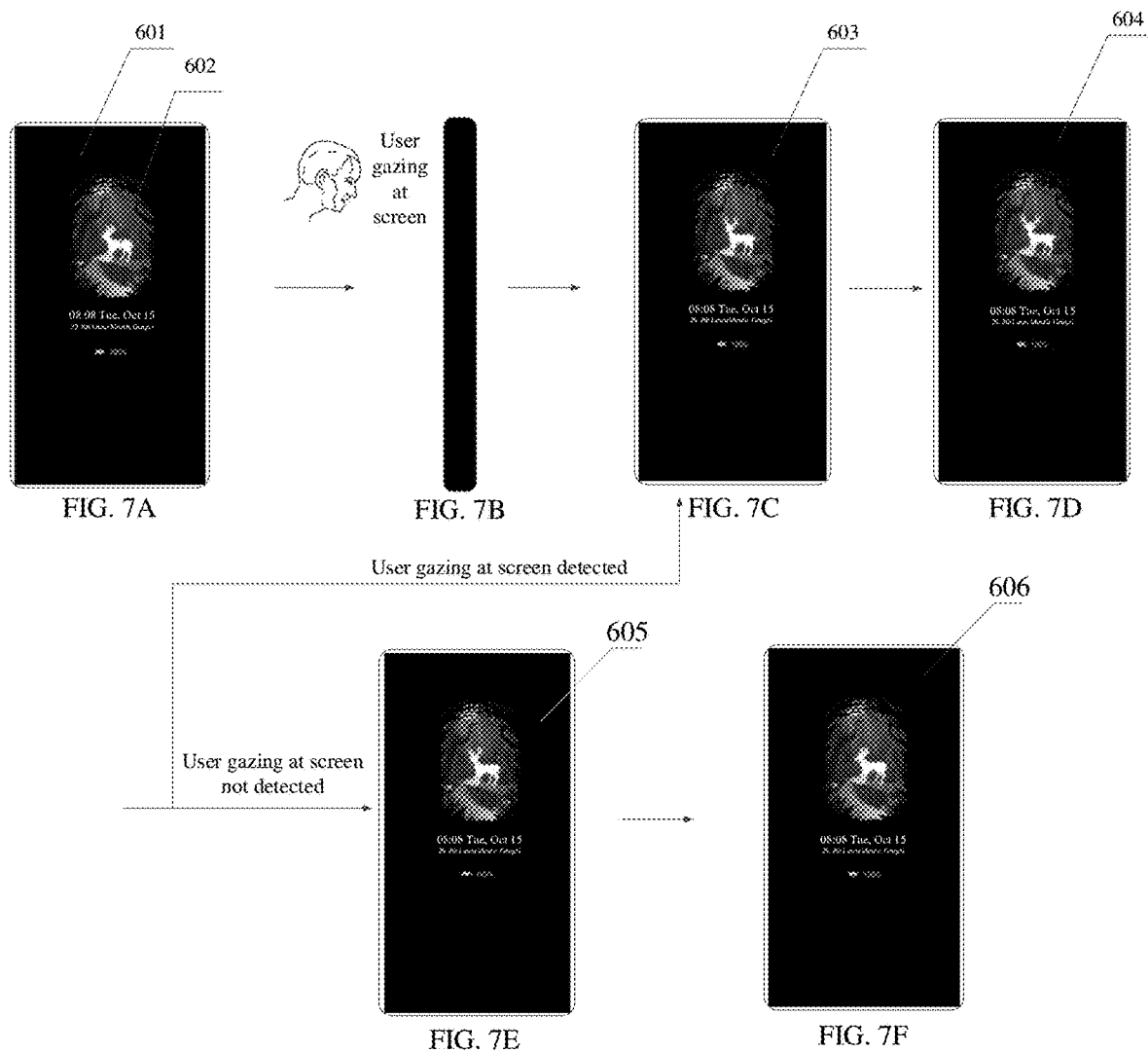

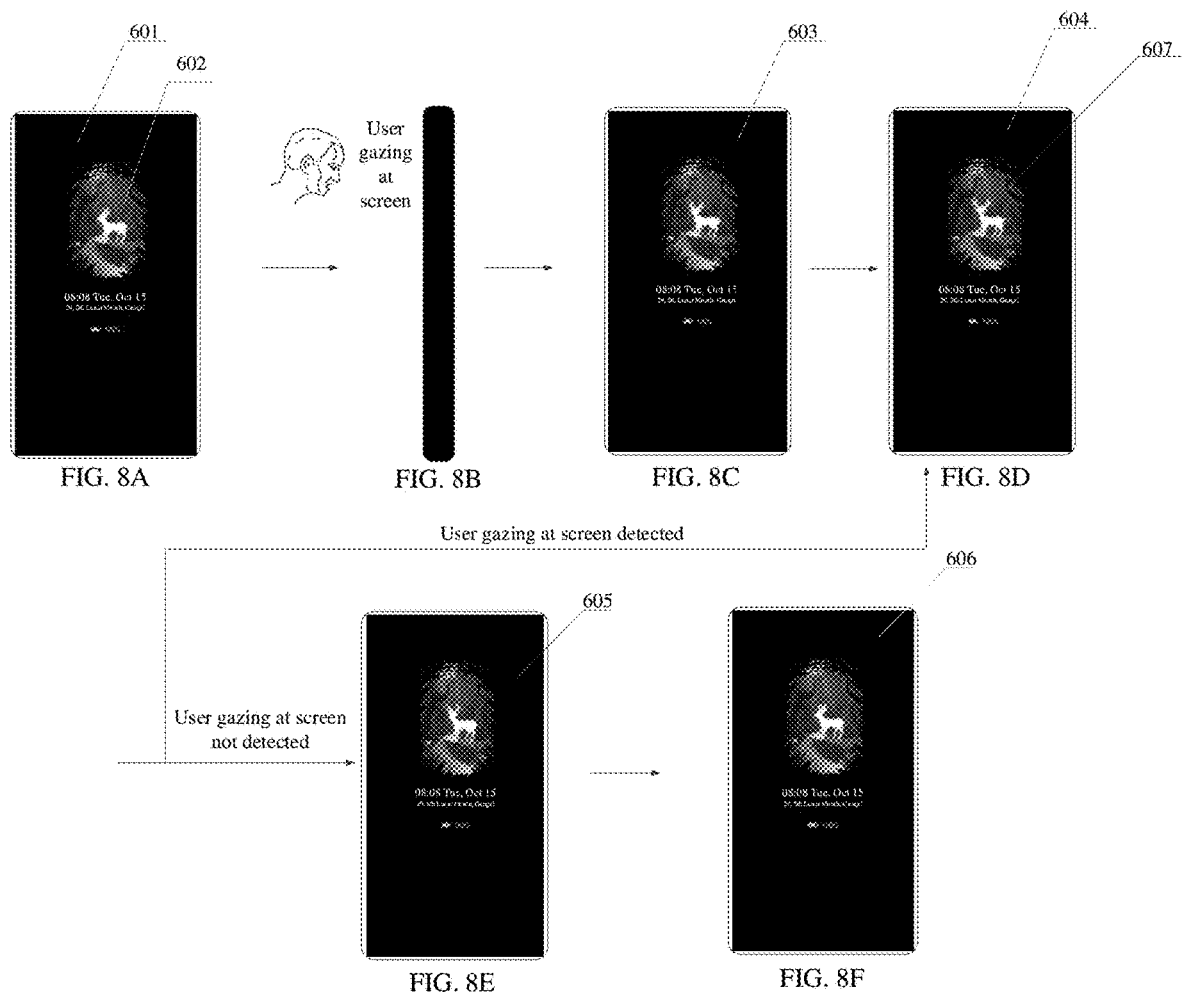

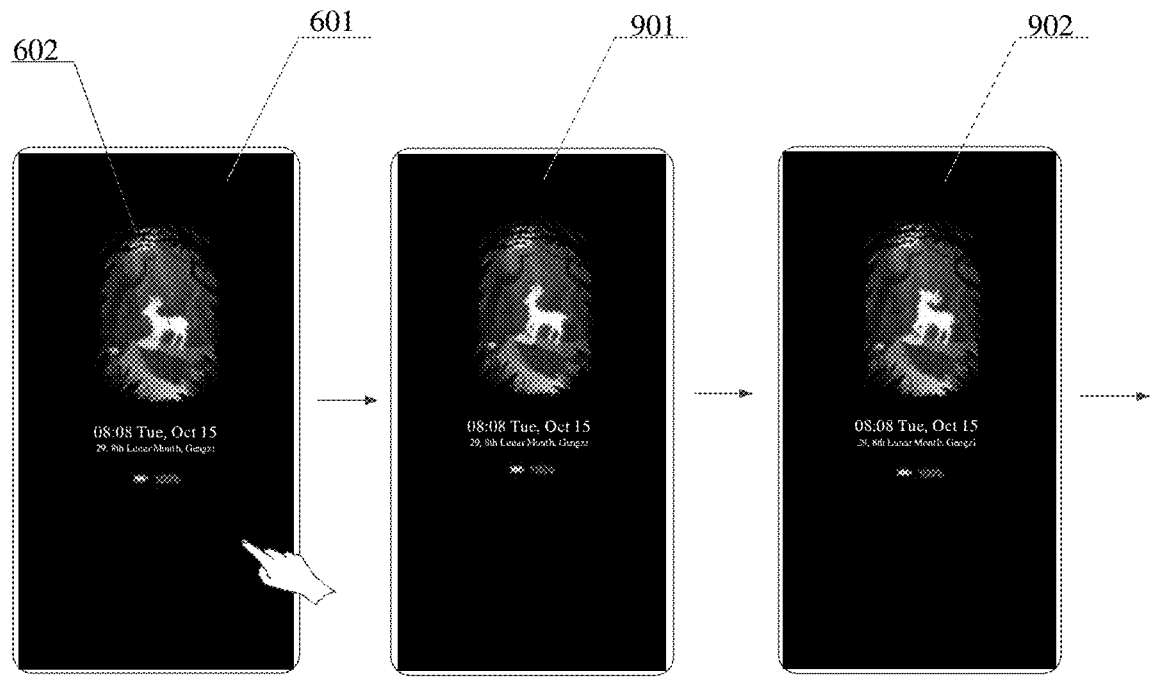
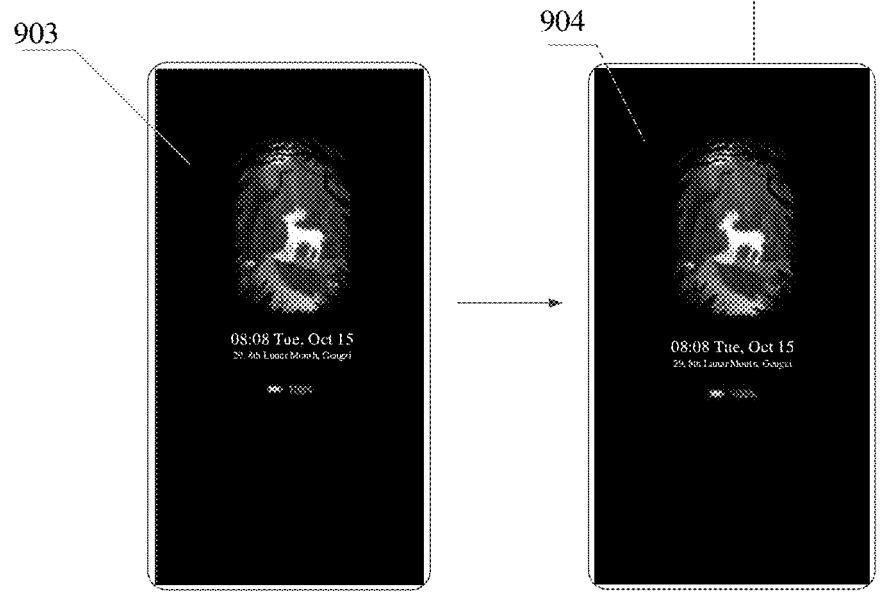
FIG. 9A  FIG. 9B  FIG. 9C
FIG. 9D  FIG. 9E

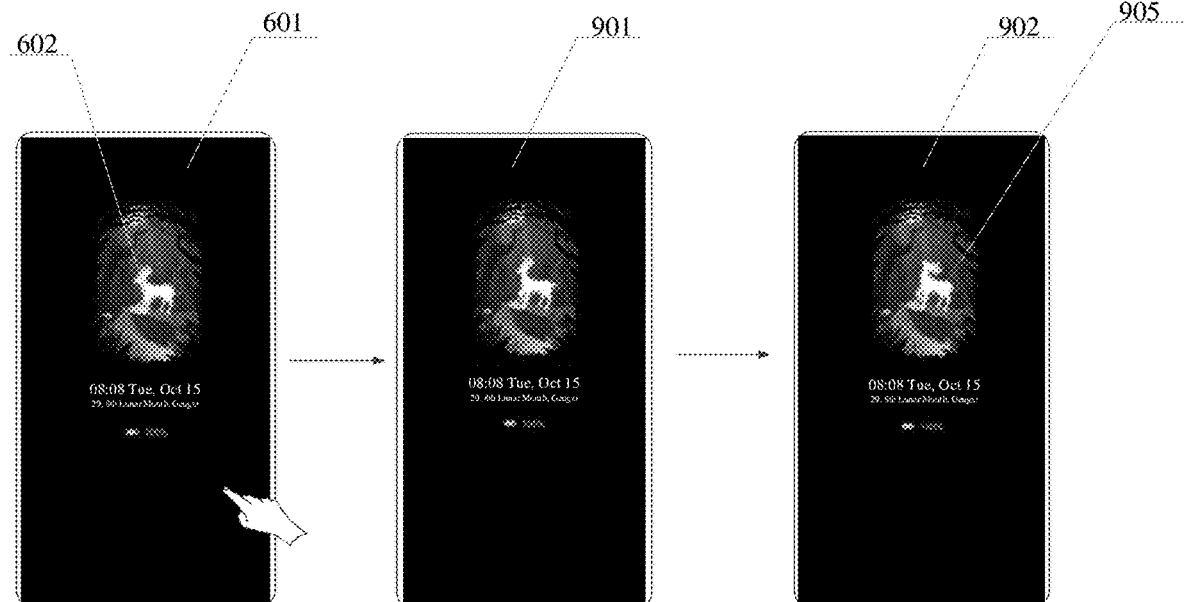
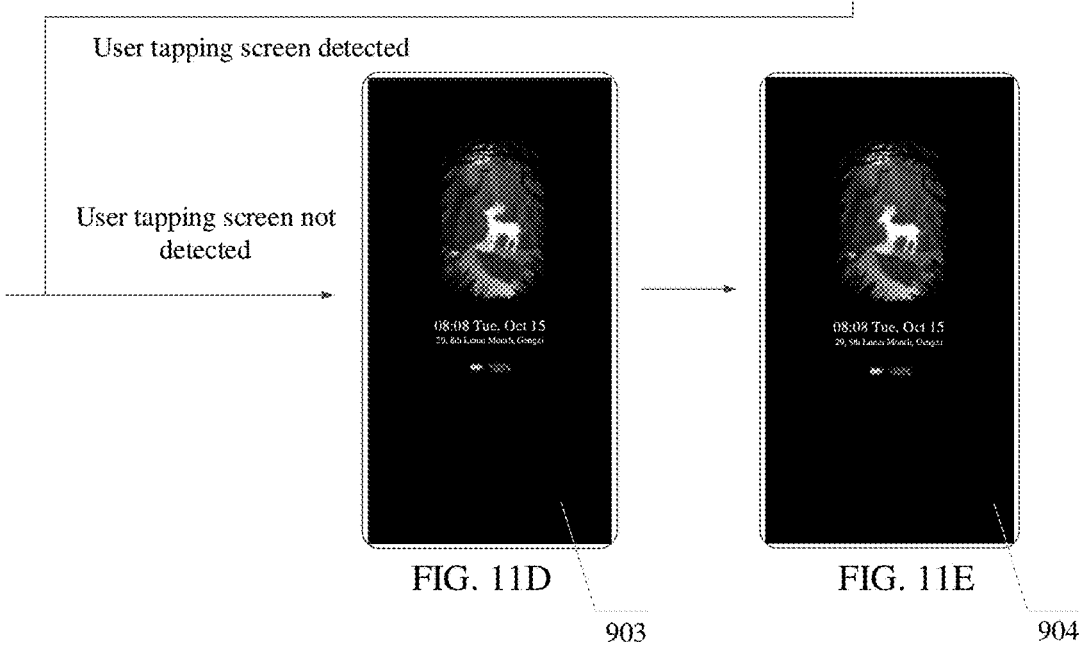

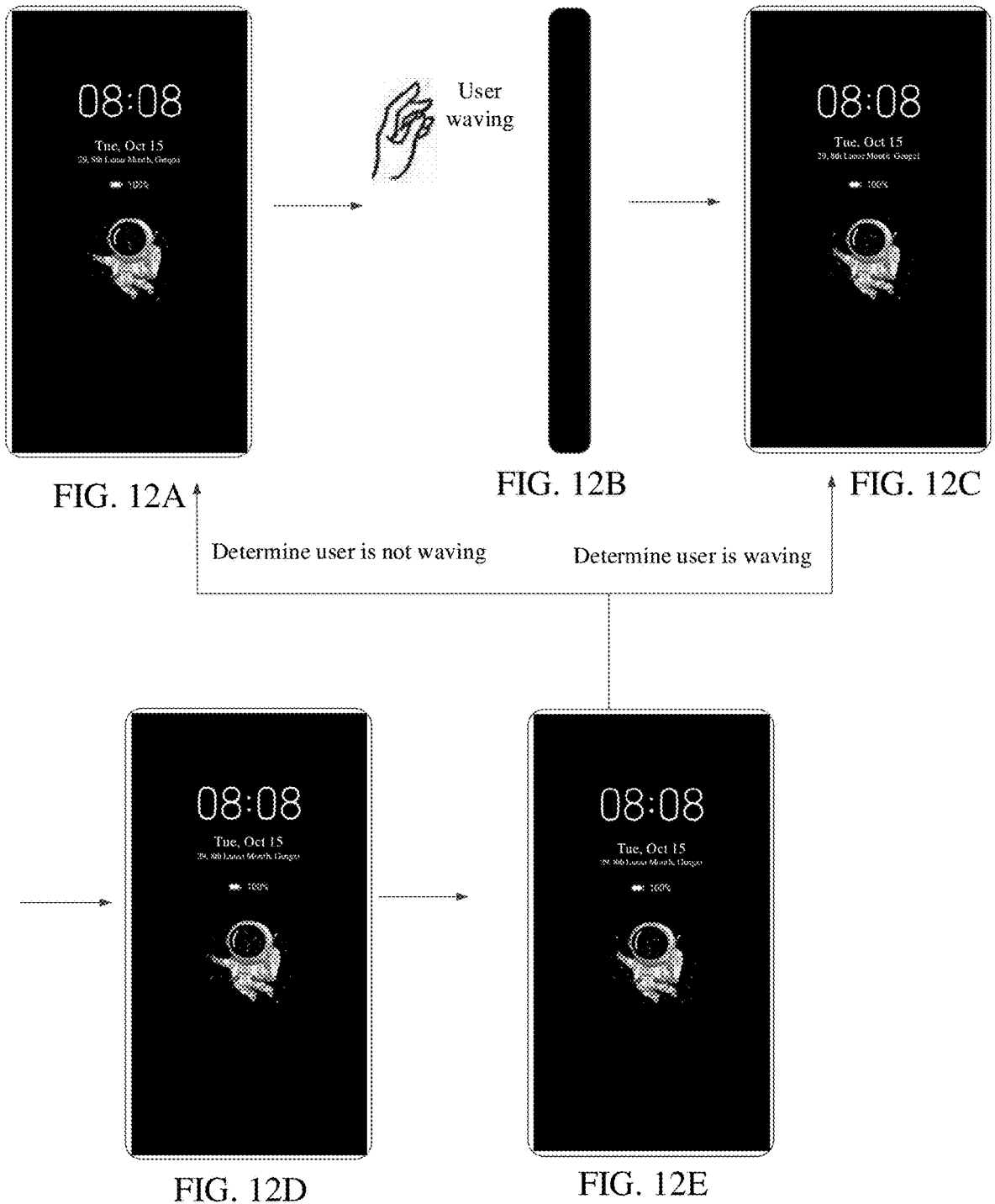

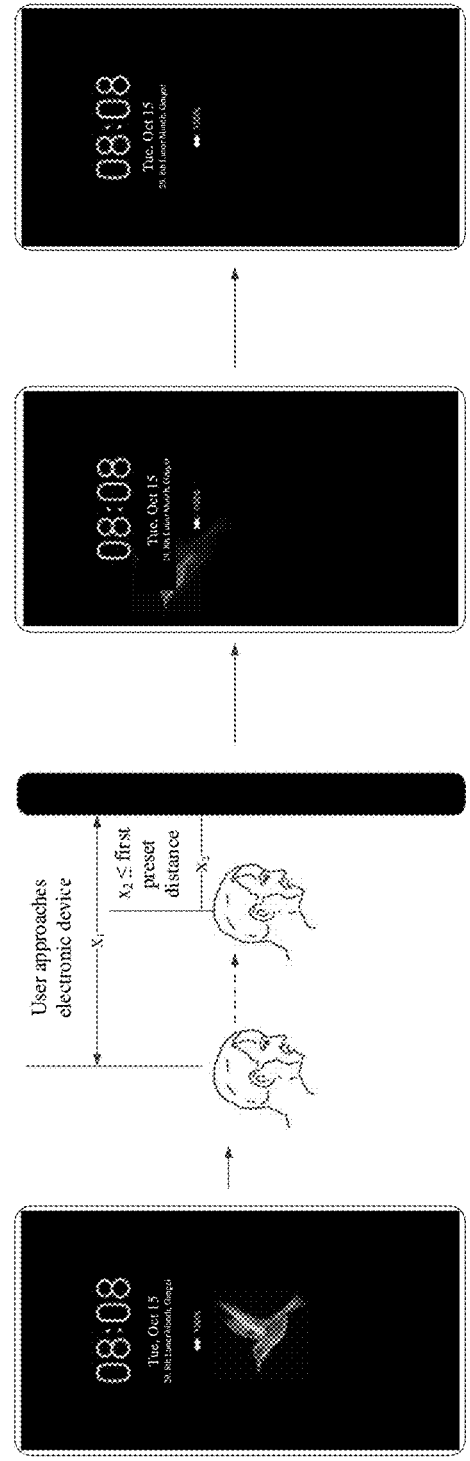

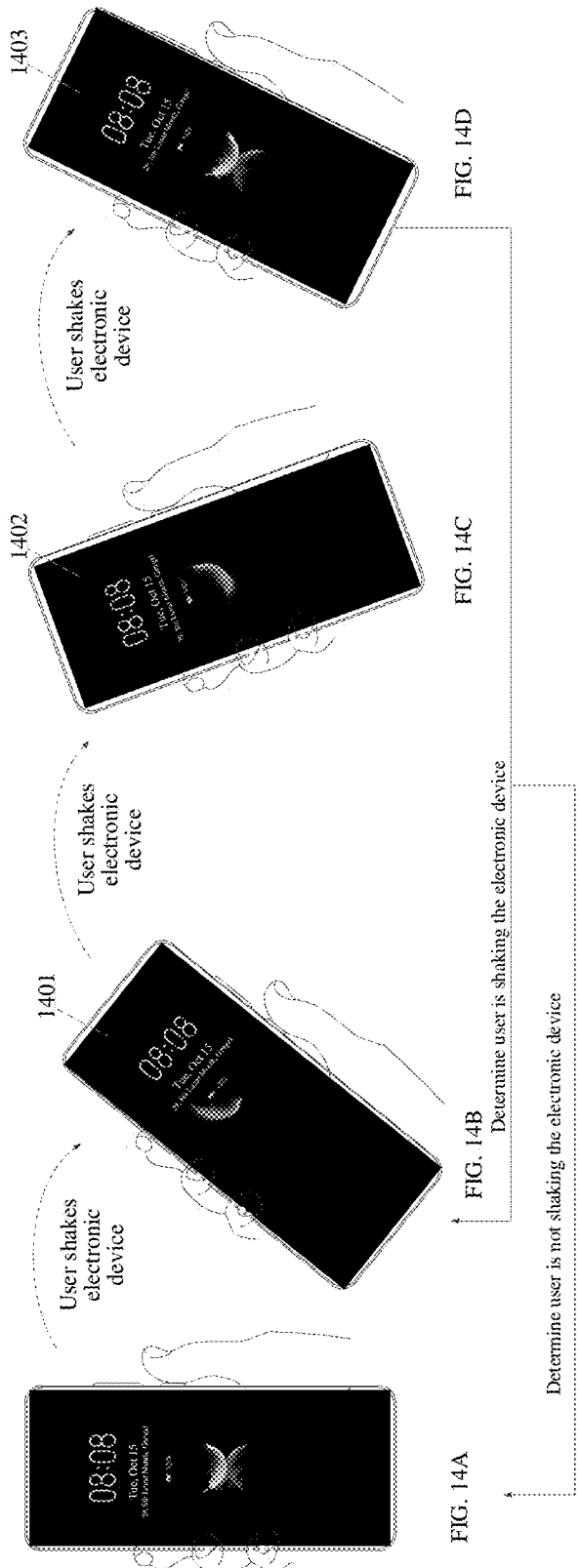

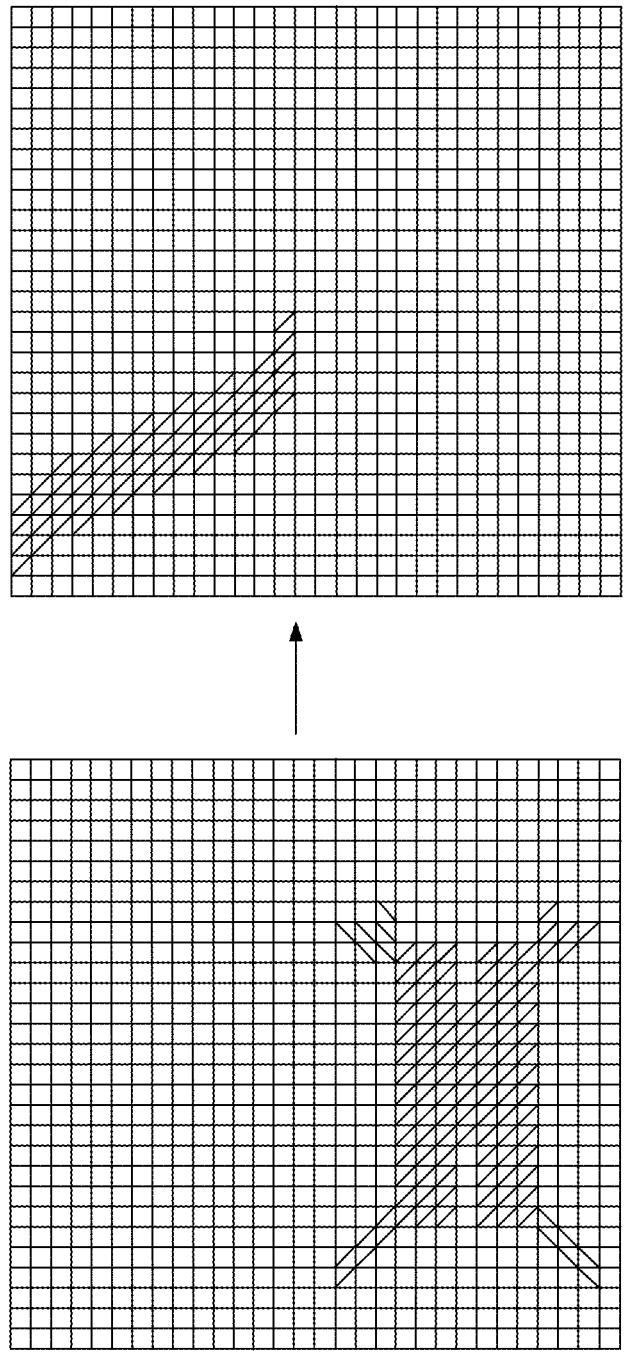

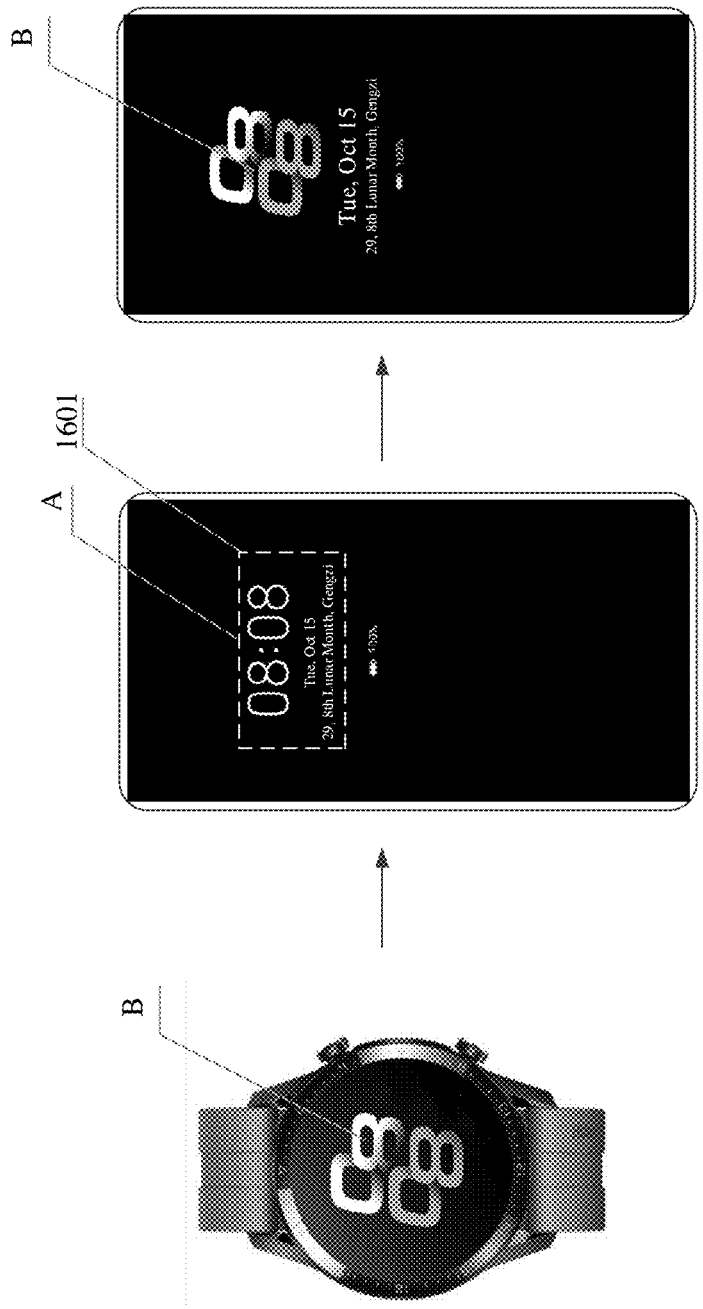

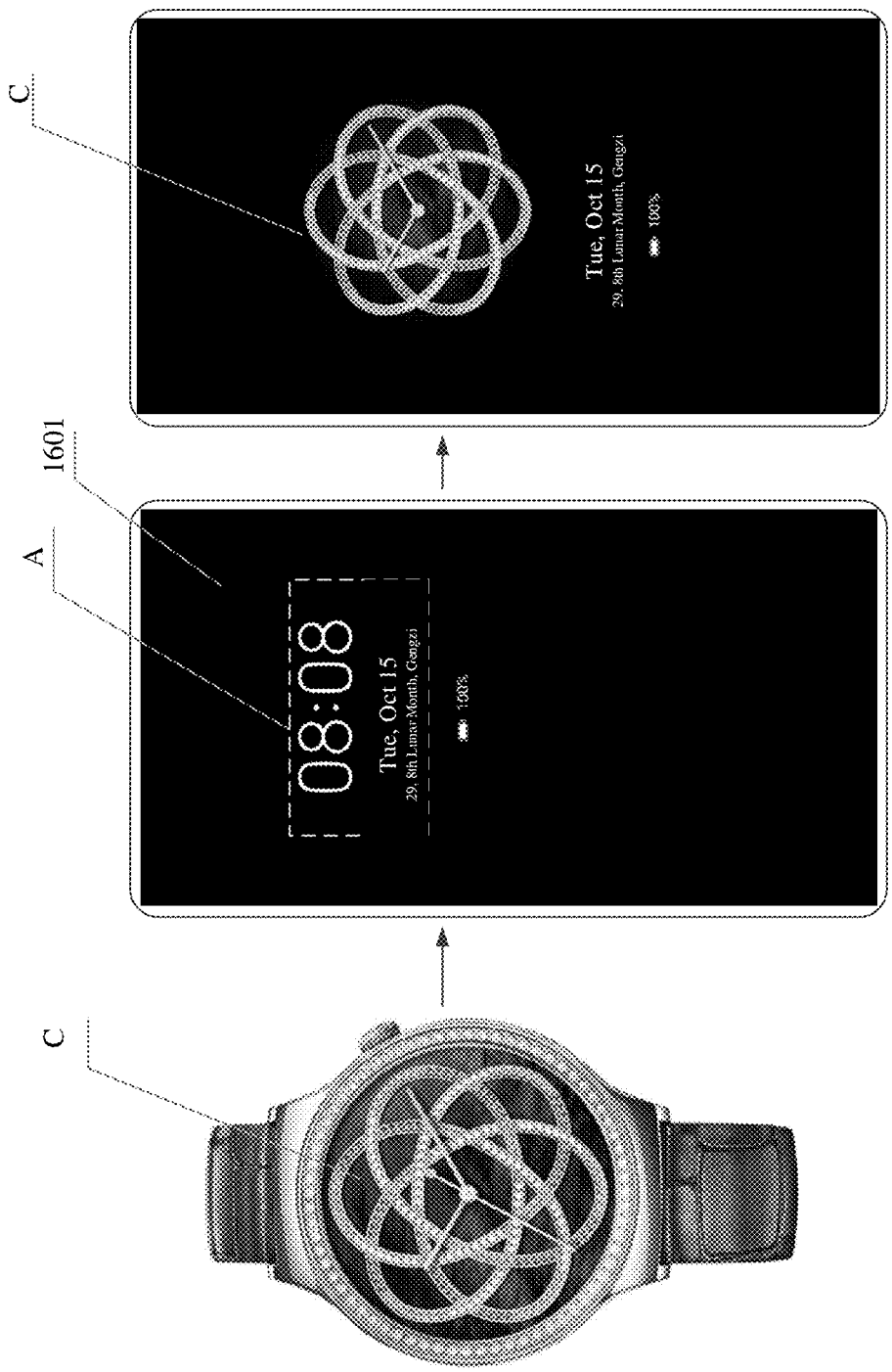

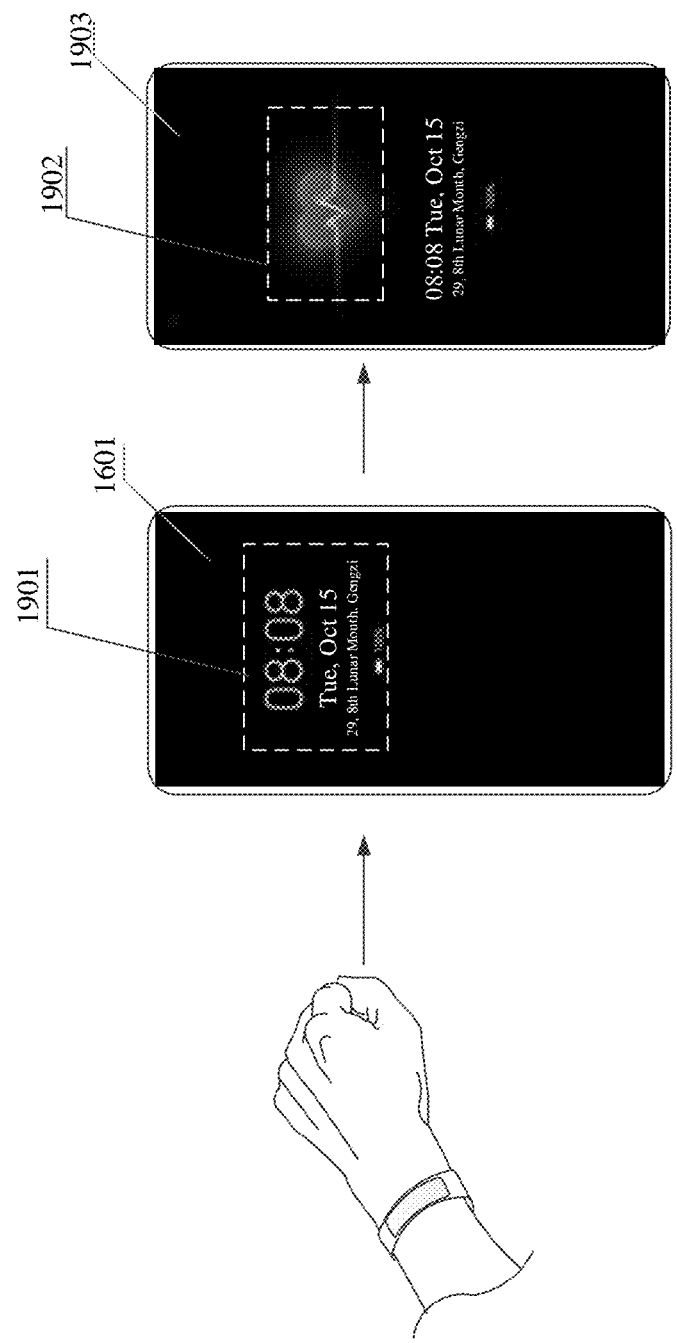

ALWAYS-ON-DISPLAY METHOD AND ELECTRONIC DEVICE

CROSS-REFERENCE TO RELATED APPLICATION

This application is a continuation of U.S. patent application Ser. No. 17/801,478, filed on Aug. 22, 2022, which is a national stage of International Application No. PCT/CN2021/114607, filed on Aug. 25, 2021, which claims priority to Chinese Patent Application No. 202010916054.8, filed on Sep. 3, 2020. All of the aforementioned applications are hereby incorporated by reference in their entireties.

TECHNICAL FIELD

This application relates to the field of terminal technologies, and in particular, to an always-on-display method and an electronic device.

BACKGROUND

As electronic devices develop, their functions are ever diversified. For example, for an electronic device with an always-on-display (Always-On-Display, AOD) function, when the electronic device is screen-off, time and other information are displayed on an always-on-display screen, so that a user can check the time on the electronic device at any time with no need to repeatedly light the screen. This reduces power consumption of the electronic device and improves user experience.

However, the current always-on-display screen is rather monotonous in no support of flexible display.

SUMMARY

Embodiments of this application provide an always-on-display method and an electronic device to implement flexible display of an always-on-display screen.

According to a first aspect, an embodiment of this application provides an always-on-display method, including: displaying, by an electronic device, an always-on-display screen, where the always-on-display screen includes a first image of a first display object; in response to detecting by the electronic device that an external object satisfies a first preset condition, displaying, by the electronic device, a second image of a second display object, where the second image is different from the first image.

The first display object may be the same as or different from the second display object. The second image may be a motion video or a still image.

In this solution, the always-on-display screen displayed by the electronic device can change according to the external object. When the external object satisfies a preset condition, a corresponding image or motion video is displayed, so that the always-on-display screen can be flexibly displayed.

In a possible implementation, the electronic device may end display of the second image after displaying the second image, and in another possible implementation, after the electronic device displays the second image, the method further includes: maintaining display of the second image if the electronic device has detected that the external object satisfies a second preset condition; and resuming display of the first image if the electronic device has not detected that the external object satisfies a second preset condition.

The first preset condition may be the same as or different from the second preset condition.

This solution provides a specific implementation of the electronic device after the second image is displayed. For example, if the external object satisfies the second preset condition, display of the second image is maintained, so that the electronic device continuously responds to the external object satisfying the second preset condition, thereby ensuring durability of display of the second image on the always-on-display screen and improving user experience. For example, if the external object does not satisfy the second preset condition, display of the first image is resumed, so that the electronic device is restored to an original state, which reduces power consumption of the electronic device.

If the second image is a motion video, in a possible implementation, the maintaining display of the second image includes: maintaining, by the electronic device, display of the last frame image of the motion video; and in another possible implementation, the maintaining display of the second image may alternatively be: repeatedly playing the motion video.

If the last frame image of the motion video is different from the first image, before the resuming display of the first image, the method further includes: displaying, by the electronic device, a transition image for linking the second image with the first image. This solution enables gradual changing from the second image back to the first image, which realizes smooth display of the always-on-display screen.

In a possible implementation, before the displaying the first image, the method further includes: displaying, by the electronic device, an initial image, where the initial image is used for linking display of the first image. This solution allows the always-on-display screen to be displayed more flexibly.

The first preset condition and the second preset condition in the foregoing solution include one or more of the following: user waving, nodding, shaking the head, gazing at screen of the electronic device, tapping screen of the electronic device, or shaking the electronic device, or an external device being connected.

In a possible implementation, before the displaying, by the electronic device, a second image of a second display object, the method further includes: obtaining, by the electronic device, information about the external object, and determining, by the electronic device, a display parameter of the second image based on the information about the external object; and the displaying, by the electronic device, a second image of a second display object includes: displaying, by the electronic device, the second image according to the display parameter. Optionally, the display parameter of the second image includes one or more of the following: a header orientation parameter of the second display object in the second image, a posture parameter of the second display object in the second image, a display frame rate of the second image, a display position parameter of the second display object in the second image, a style of the second display object in the second image, and a waveform parameter of the second display object in the second image. In this solution, the display parameter of the second image is determined, so that the always-on-display screen is displayed more flexibly.

The information about the external object may be operation information of the external object (for example, a user) or information sent by the external object (for example, an external device). The operation information of the external object includes one or more of the following: a gaze position of the external object on the screen of the electronic device, a strength parameter of an action of the external object, strength of tapping by a user on the screen, and a direction in which the external object approaches the electronic device. The action of the external object includes, but is not limited to, at least one of the following: waving, nodding, shaking the head, turning the head, making an OK gesture, making a scissor hand gesture, making a smiling face, making a crying face, and making a surprise face. For example, when the action of the external object is waving, the strength parameter of the action of the external object may be a speed of waving.

In a possible implementation, the information about the external object includes biological information sent by the external device; the determining, by the electronic device, a display parameter of the second image based on the information about the external object includes: determining, by the electronic device, a display frame rate of the second image based on the biological information; and the determining, by the electronic device, the second image according to the display parameter includes: displaying, by the electronic device, the second image at the display frame rate.

The biological information may be one or more of the following: heart rate, calories, and number of steps. The information sent by the external device is not limited to the heart rate in the example, but may alternatively be other biological information, weather information, or location information. The other biological information may include, but is not limited to, at least one of the following: calories and number of steps. The weather information may include, but is not limited to, at least one of the following: temperature and weather. The weather is, for example, light rain, sunny, cloudy, or heavy snow.

In this solution, the electronic device flexibly displays the always-on-display screen through interaction between the external device and the electronic device, allowing the user to obtain biological information through the always-on-display screen. In this way, not only the always-on-display screen can be flexibly displayed, but also functionality of the electronic device is improved.

In a possible implementation, the information about the external object includes style information sent by the external device; the determining, by the electronic device, a display parameter of the second image based on the information about the external object includes: determining, by the electronic device, a style of the second display object based on the style information; and the determining, by the electronic device, the second image according to the display parameter includes: displaying, by the electronic device, the second display object in the style, where the second image includes the second display object displayed in the style.

This solution allows an object displayed on the always-on-display screen to change its style with the changing of the external device, implementing flexible display of the always-on-display screen.

In a possible implementation, before the electronic device displays the first image, the method further includes: obtaining, by the electronic device, an interactive mode selection instruction input by a user, and determining, by the electronic device, the first display object matching the interactive mode according to the interactive mode selection instruction.

This solution provides a specific implementation of settings of the always-on-display screen. In this specific implementation, a user may select an interactive mode as required.

In a possible implementation, the electronic device may determine the first preset condition and the second preset condition based on the interactive mode. The interactive mode may correspond to a plurality of first preset conditions and/or a plurality of second preset conditions. Different first preset conditions may correspond to different second images or correspond to the same second image. Different second preset conditions may correspond to different transition images or correspond to the same transition image.

In a possible implementation, the electronic device may determine the first preset condition and the second preset condition based on the first display object. The display object may correspond to a plurality of first preset conditions and/or a plurality of second preset conditions. Different first preset conditions may correspond to different second images or correspond to the same second image. Different second preset conditions may correspond to different transition images or correspond to the same transition image.

According to a second aspect, an embodiment of this application provides an electronic device, including one or more displays, one or more memories, and one or more processors; where the one or more memories store one or more programs, and when the one or more processors execute the one or more programs, the electronic device is enabled to implement the method according to the first aspect or any possible implementation of the first aspect.

According to a third aspect, an embodiment of this application provides a non-transitory computer-readable storage medium storing a computer instruction, where the computer instruction is used to enable the computer to execute the method according to the first aspect or any possible implementation of the first aspect.

According to a fourth aspect, an embodiment of this application provides a graphical user interface GUI, where the graphical user interface is stored in an electronic device, the electronic device includes a display, a memory, and a processor, and the processor is configured to execute a computer program stored in the memory, where the graphical user interface includes a graphical user interface displayed when the electronic device executes the method according to the first aspect or any possible implementation of the first aspect.

According to a fifth aspect, an embodiment of this application provides a computer program product, where the computer program product includes an instruction, when the instruction is executed, a computer is enabled to execute the method according to any one of the first aspect or any possible implementation of the first aspect.

BRIEF DESCRIPTION OF DRAWINGS

FIG. 4A to FIG. 4E are a schematic diagram of screens of always-on-display setting according to an embodiment of this application;

FIG. 5A to FIG. 5C are a schematic diagram of displaying an initial image according to an embodiment of this application;

FIG. 6A to FIG. 6F are a first schematic diagram of changing of an always-on-display screen according to an embodiment of this application;

FIG. 7A to FIG. 7F are a second schematic diagram of changing of an always-on-display screen according to an embodiment of this application;

FIG. 8A to FIG. 8F are a third schematic diagram of changing of an always-on-display screen according to an embodiment of this application;

FIG. 9A to FIG. 9E are a fourth schematic diagram of changing of an always-on-display screen according to an embodiment of this application;

FIG. 11A to FIG. 11E are a sixth schematic diagram of changing of an always-on-display screen according to an embodiment of this application;

FIG. 12A to FIG. 12E are a seventh schematic diagram of changing of an always-on-display screen according to an embodiment of this application;

FIG. 13A to FIG. 13F are an eighth schematic diagram of changing of an always-on-display screen according to an embodiment of this application;

FIG. 14A to FIG. 14D are a ninth schematic diagram of changing of an always-on-display screen according to an embodiment of this application;

FIG. 15A is a schematic diagram of pixels that are lit to display a virtual feather which is still according to an embodiment of this application;

FIG. 15B is a schematic diagram of pixels that are lit to display a virtual feather which is floating according to an embodiment of this application;

FIG. 16A to FIG. 16C are a tenth schematic diagram of changing of an always-on-display screen according to an embodiment of this application;

FIG. 17A to FIG. 17C are an eleventh schematic diagram of changing of an always-on-display screen according to an embodiment of this application;

FIG. 19A to FIG. 19C are a thirteenth schematic diagram of changing of an always-on-display screen according to an embodiment of this application;

DESCRIPTION OF EMBODIMENTS

The following details implementations of the embodiments with reference to the accompanying drawings.

Figure 1:
FIG. 1 is a schematic diagram of a current always-on-display screen.

As shown in FIG. 1, when an electronic device is screen-off, the electronic device may display information such as time, date, and battery power on an always-on-display screen. In this way, a user can check information such as time, date, and battery power on the electronic device at any time. However, in the solution shown in FIG. 1, the always-on-display screen is rather monotonous in no support of flexible display. To realize flexible display of the always-on-display screen, embodiments of this application provide an always-on-display method which displays an always-on-display screen according to changing of external interaction.

Figure 2:
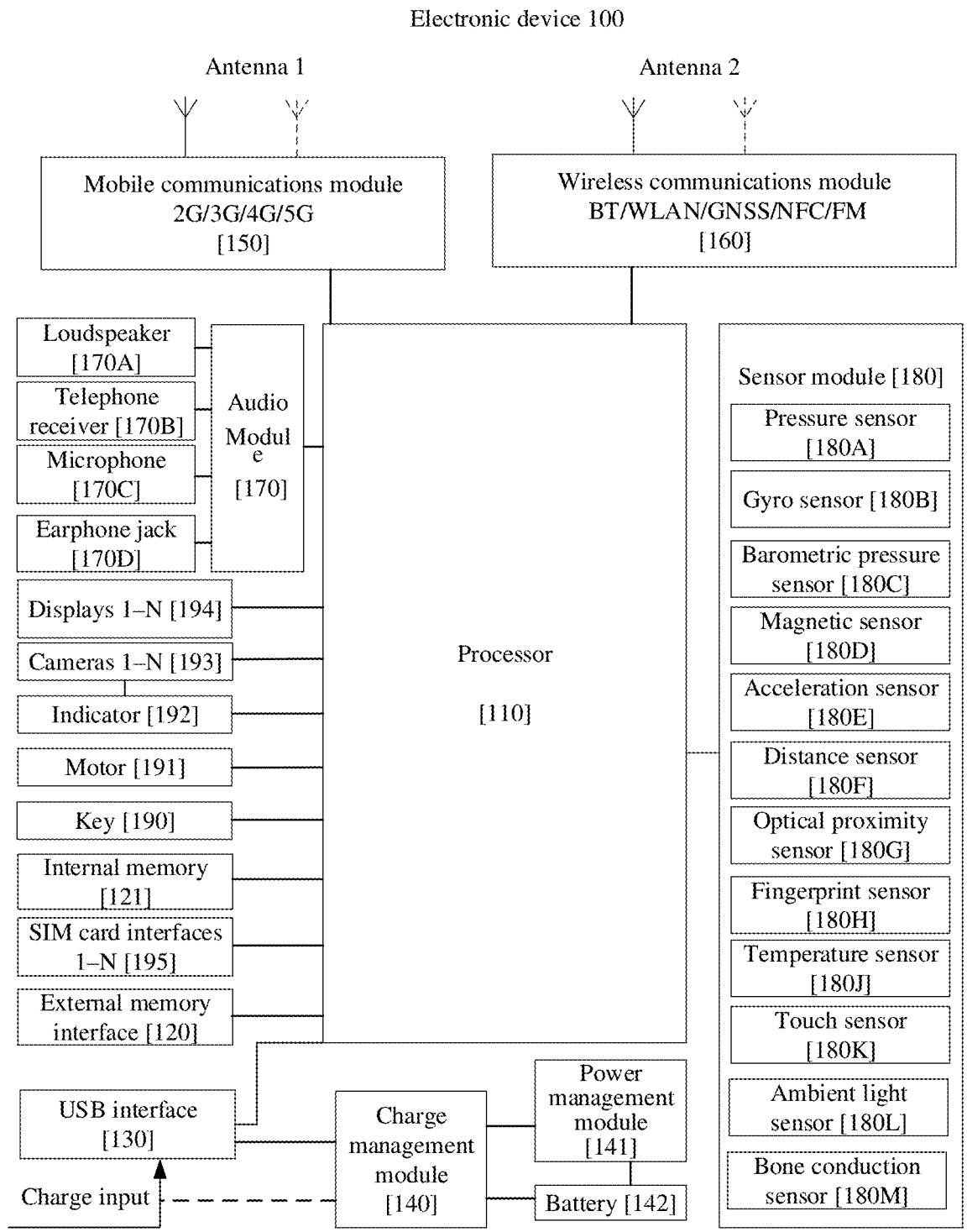
FIG. 2 is a schematic structural diagram of an electronic device according to an embodiment of this application.

The always-on-display method provided in the embodiments of this application may be applied to electronic devices such as mobile phones, tablet computers, smart watches, and computers. For example, FIG. 2 is a schematic structural diagram of an electronic device according to an embodiment of this application. Referring to FIG. 2, the electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a loudspeaker 170A, a telephone receiver 170B, a microphone 170C, an earphone jack 170D, a sensor module 180, a key 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment of this application does not constitute a specific limitation on the electronic device 100. In some other embodiments of this application, the electronic device 100 may include more or fewer components than those shown in the figure, or combine some components, or split some components, or have a different component arrangement. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be separate devices or be integrated into one or more processors.

The controller may generate an operation control signal according to an instruction operation code and a timing signal, to complete control of instruction fetching and execution.

A memory may be further provided in the processor 110 to store instructions and data. In some embodiments, the memory in the processor 110 is a cache memory. The memory may store instructions or data that the processor 110 has recently used or used repeatedly. If the processor 110 needs to use the instruction or the data again, the processor 110 may directly invoke the instruction or the data from the memory, thereby avoiding repeated access, reducing waiting time of the processor 110, and improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus which includes a serial data line (serial data line, SDA) and a serial clock line (derail clock line, SCL). In some embodiments, the processor 110 may include multiple I2C buses. The processor 110 may be coupled to the touch sensor 180K, a charger, a flash, the camera 193, and the like via different I2C bus interfaces. For example, the processor 110 may be coupled to the touch sensor 180K via the I2C interface, so that the processor 110 and the touch sensor 180K communicate through the I2C bus interface to implement a touch function of the electronic device 100.

The I2S interface may be used for audio communication. In some embodiments, the processor 110 may include multiple I2S buses. The processor 110 may be coupled to the audio module 170 via an I2S bus to implement communication between the processor 110 and the audio module 170. In some embodiments, the audio module 170 may transmit an audio signal to the wireless communications module 160 through the I2S interface, so as to implement a function of answering calls through a Bluetooth earphone.

The PCM interface may also be used for audio communication to sample, quantize, and encode an analog signal. In some embodiments, the audio module 170 and the wireless communications module 160 may be coupled via a PCM bus interface. In some embodiments, the audio module 170 may also transmit an audio signal to the wireless communications module 160 through the PCM interface, so as to implement a function of answering calls through a Bluetooth earphone. Both the I2S interface and the PCM interface may be used for audio communication.

The UART interface is a universal serial data bus used for asynchronous communication. The bus may be a bidirectional communications bus that converts to-be-transmitted data between serial communication and parallel communication. In some embodiments, the UART interface is typically configured to connect the processor 110 to the wireless communications module 160. For example, the processor 110 communicates with a Bluetooth module of the wireless communications module 160 through the UART interface, to implement a Bluetooth function. In some embodiments, the audio module 170 may transmit an audio signal to the wireless communications module 160 through the UART interface, so as to implement a function of playing music through a Bluetooth earphone.

The MIPI interface may be configured to connect the processor 110 to the display 194, the camera 193, and other peripheral devices. The MIPI interface includes a camera serial interface (camera serial interface, CSI), a display serial interface (display serial interface, DSI), and the like. In some embodiments, the processor 110 communicates with the camera 193 through the CSI interface, thereby implementing a shooting function of the electronic device 100. The processor 110 communicates with the display 194 through the DSI interface, thereby implementing a display function of the electronic device 100.

It may be understood that the interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or a combination of a plurality of interface connection manners.

The mobile communications module 150 may provide wireless communication solutions including 2G, 3G, 4G, and 5G for application to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the processed electromagnetic wave to the modem processor for demodulation. The mobile communications module 150 may also amplify a signal modulated by the modem processor, and convert the signal into an electromagnetic wave which is transmitted by the antenna 1. In some embodiments, at least some functional modules of the mobile communications module 150 may be provided in the processor 110. In some embodiments, at least some functional modules of the mobile communications module 150 and at least some modules of the processor 110 may be provided in a same device.

The modem processor may include a modulator and a demodulator. The modulator is configured to modulate a low frequency baseband signal that is to be sent into a medium or high frequency signal. The demodulator is configured to demodulate a received electromagnetic wave signal into a low frequency baseband signal. Then, the demodulator sends the low frequency baseband signal obtained through demodulation to the baseband processor for processing. After being processed by the baseband processor, the low frequency baseband signal is transferred to the application processor. The application processor outputs a sound signal through an audio device (not limited to the loudspeaker 170A, the telephone receiver 170B, and the like), or displays an image or a video through the display 194. In some embodiments, the modem processor may be a separate device. In some other embodiments, the modem processor may be separate from the processor 110 and provided in a same device together with the mobile communications module 150 or another functional module.

The wireless communications module 160 may provide wireless communication solutions for application to the electronic device 100, which include, for example, wireless local area network (wireless local area networks, WLAN) (for example, Wi-Fi network), BT, global navigation satellite system (global navigation satellite system, GNSS), frequency modulation (frequency modulation, FM), near field communication (near field communication, NFC), and infrared (infrared, IR). The wireless communications module 160 may be one or more devices integrating at least one communication processing module. The wireless communications module 160 receives an electromagnetic wave through the antenna 2, performs frequency modulation and filtering processing on the electromagnetic wave signal, and transmits the processed signal to the processor 110. The wireless communications module 160 may also receive a to-be-transmitted signal from the processor 110, perform frequency modulation and amplification on the signal, and transmit the signal as an electromagnetic wave by using the antenna 2.

In some embodiments, in the electronic device 100, the antenna 1 is coupled to the mobile communications module 150, and the antenna 2 is coupled to the wireless communications module 160, so that the electronic device 100 can communicate with a network and other devices by using a wireless communications technology. The wireless communications technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR technology, and/or the like. The GNSS may include the global positioning system (global positioning system, GPS), global navigation satellite system (global navigation satellite system, GLONASS), Beidou navigation satellite system (beidou navigation satellite system, BDS), quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is an image processing microprocessor which is connected to the display 194 and the application processor. The GPU is configured to perform mathematical and geometric calculation, and is used for graphics rendering. The processor 110 may include one or more GPUs that execute a program instruction to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a MicrooLed, a quantum dot light emitting diode (quantum dot light emitting diodes, QLED), or the like. In some embodiments, the electronic device 100 may include one or N displays 194, where N is a positive integer greater than 1.

Optionally, the touch sensor may be disposed on the display, and the touch sensor and the display 194 form a touchscreen, also referred to as a "touch screen". The touch sensor is configured to detect a touch operation applied on or near the touch sensor. The touch sensor may transfer the detected touch operation to the application processor for determining a touch event type, and may provide a visual output associated with the touch operation through the display 194. The touch sensor may alternatively be disposed on a surface of the electronic device 100 at a location different from that of the display 194. The touch sensor may also be referred to as a touch panel or touch-sensitive surface.

The electronic device 100 may implement a shooting function by using the ISP, the camera 193, the video codec, the GPU, the display 194, the application processor, and the like.

The ISP is configured to process data fed back by the camera 193. For example, during photographing, a shutter is open, allowing light to be transmitted to a photosensitive element of the camera through a lens. An optical signal is converted into an electrical signal. The photosensitive element of the camera transfers the electrical signal to the ISP for processing, so as to convert the electrical signal into an image visible to the naked eye. The ISP may further optimize noise, brightness, and skin color of the image using algorithms. The ISP may further optimize parameters such as exposure and color temperature of a shooting scene. In some embodiments, the ISP may be disposed in the camera 193.

The digital signal processor is configured to process digital signals, able to process not only digital image signals but also other digital signals. For example, when the electronic device 100 is selecting a frequency, the digital signal processor is configured to perform Fourier transform and the like on frequency energy.

The video codec is configured to compress or decompress a digital video. The electronic device 100 may support one or more types of video codecs, so that the electronic device 100 can play or record videos in a plurality of coding formats, such as moving picture experts group (moving picture experts group, MPEG) 1, MPEG2, MPEG3, and MPEG4.

The NPU is a neural-network (neural-network, NN) computing processor which borrows the structure of biological neural networks, for example, borrowing the transfer mode between human brain neurons, to fast process input information and which is also capable of continuous self-learning. The NPU may be used for implementing applications such as intelligent cognition of the electronic device 100, for example, image recognition, facial recognition, voice recognition, and text understanding.

The external memory interface 120 may be configured to connect an external storage card (for example, a Micro SD card) so as to extend a storage capacity of the electronic device 100. The external storage card communicates with the processor 110 through the external memory interface 120 to implement a data storage function, for example, store files such as music files and video files in the external storage card.

The internal memory 121 may be configured to store computer executable program code which includes instructions. The internal memory 121 may include a storage program area and a data storage area. The storage program area may store an operating system, an application program required by at least one function (for example, a sound play function or an image play function), and the like. The data storage area may store data (for example, audio data and contacts) created during use of the electronic device 100, and the like. In addition, the internal memory 121 may include a high-speed random access memory or include a non-volatile memory, for example, at least one magnetic disk storage device, flash memory device, and universal flash storage (universal flash storage, UFS). By running the instructions stored in the internal memory 121 and/or the instructions stored in the memory that is provided in the processor, the processor 110 executes various functional applications and data processing of the electronic device 100.

The electronic device 100 may use the audio module 170, the loudspeaker 170A, the telephone receiver 170B, the microphone 170C, the earphone jack 170D, the application processor, and the like to implement an audio function, for example, music playing or sound recording.

The audio module 170 is configured to convert digital audio information into an analog audio signal output, and is also configured to convert an analog audio input into a digital audio signal. The audio module 170 may be further configured to encode and decode audio signals. In some embodiments, the audio module 170 may be provided in the processor 110, or some functional modules of the audio module 170 may be provided in the processor 110.

The following describes the always-on-display method of this application by using specific embodiments.

Figure 3:
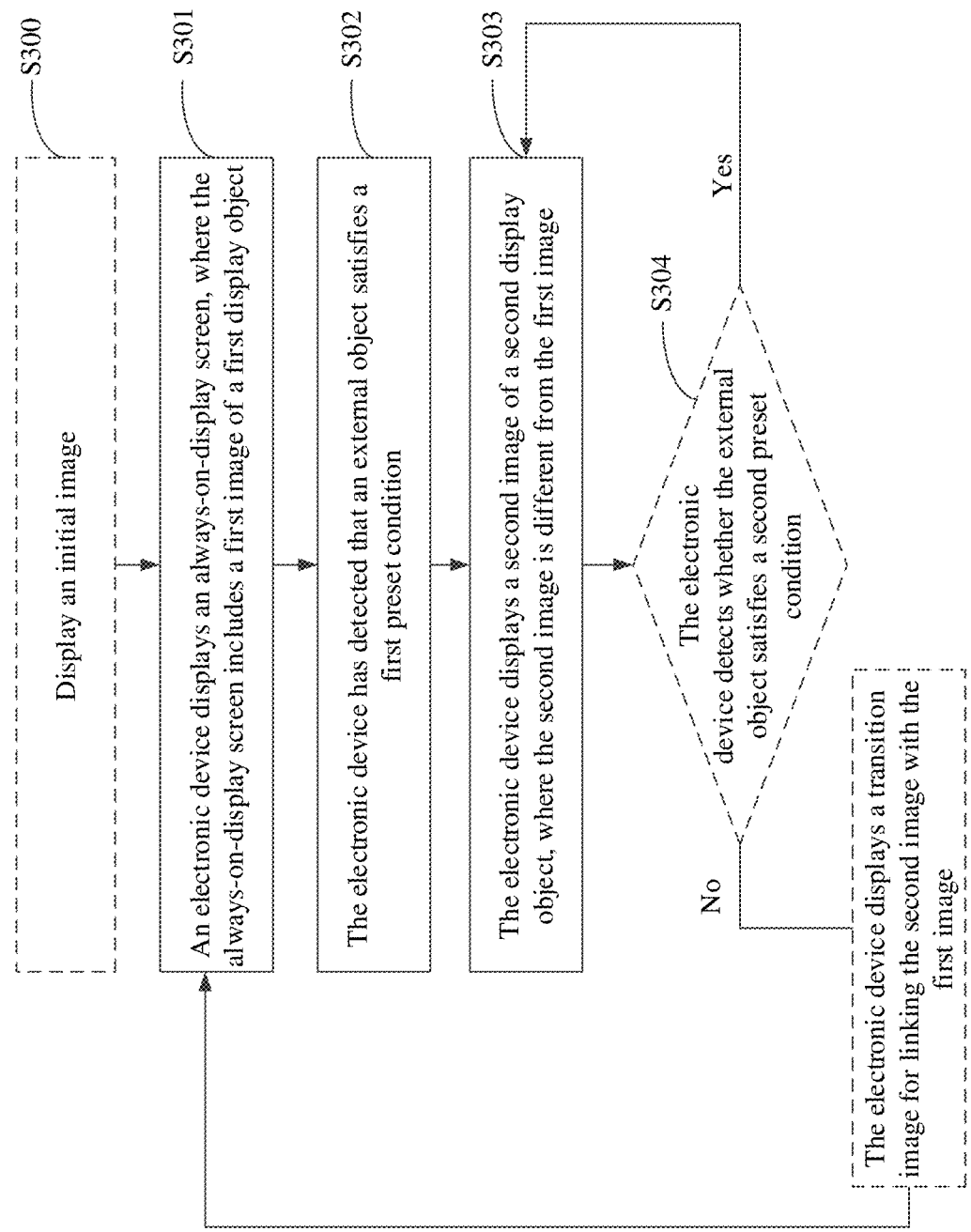
FIG. 3 is a flowchart of an always-on-display method according to an embodiment of this application.

FIG. 3 is a first flowchart of an always-on-display method according to an embodiment of this application. The method of this embodiment is applied to an electronic device, and the electronic device is in a screen-off state. Referring to FIG. 3, the method of this embodiment includes the following steps.

Step S301: The electronic device displays an always-on-display screen, where the always-on-display screen includes a first image of a first display object.

The first display object may be a virtual object such as a virtual deer, a virtual astronaut, a virtual feather, a virtual bird, or a virtual user. The first display object may be set by a user or be system default. For example, the electronic device may determine, according to an interactive mode selected by the user, the first display object matching the interactive mode, or determine, according to a theme or style selected by the user, the first display object matching the theme or style. The user may alternatively directly select one or more first display objects which are to be always on display.

It can be understood that, because an image on the always-on-display screen is displayed by lighting up some of pixels in the always-on-display screen, to prevent the pixels in the screen from malfunctioning due to long-time stay in a normally on state, the always-on-display screen may be displayed with the first display object in a changeable position.

Step S302: The electronic device has detected that an external object satisfies a first preset condition.

The external object may be a user or an external device. For example, the first preset condition may be a user operation, for example, user waving, nodding, shaking the head, gazing at screen, tapping screen, or shaking the electronic device, or the first preset condition may be, for example, establishment of a communication connection between the external device and the electronic device, or a distance from the external device to the electronic device being less than a preset distance. The first preset condition may be determined according to the interactive mode.

The first preset condition may be determined according to the first display object. To be specific, different first display objects may correspond to different first preset conditions. For example, when the first display object selected by the user is a virtual deer, the first preset condition may be user gazing at screen; and when the first display object selected by the user is a virtual feather, the first preset condition may be user shaking the electronic device.

Optionally, one first display object may correspond to a plurality of first preset conditions. For example, when the first display object selected by the user is a virtual astronaut, the first preset condition may be (1) user waving or (2) user tapping screen.

Step S303: The electronic device displays a second image of a second display object, where the second image is different from the first image.

The first display object may be the same as or different from the second display object. The second image of the second display object may be a still image or a motion video. The second image of the second display object may be stored in a server, may be stored in the electronic device, or may be stored in the external device. When one first display object corresponds to a plurality of first preset conditions, the plurality of first preset conditions may respectively correspond to different still images or motion videos. In this case, the electronic device may determine, according to a satisfied first preset condition, to display which image or motion video. For example, when the condition (1) user waving is satisfied, a first motion video of a virtual astronaut waving may be displayed; and when the condition (2) user tapping screen is satisfied, a second motion video that a virtual astronaut jumps may be displayed. For another example, when the condition (1) gazing at the right side of the screen is satisfied, a first motion video that a deer looks to the right may be displayed. When the condition (2) gazing at the left side of the screen is satisfied, a second motion video that a deer looks to the left may be displayed.

Optionally, the electronic device may determine a display parameter of the second image of the second display object according to the external object. For example, the electronic device may determine a display parameter of the second image according to data detected by the external device. For another example, the electronic device may determine a display parameter of the second image according to a user operation.

It can be understood that display positions of the second image of the second display object and the first image of the display object may be the same or different, which are not limited herein.

The electronic device may end display of the second image after display of the second image is completed. Optionally, the electronic device may alternatively determine, according to whether a second preset condition is satisfied, whether to end display of the second image.

For example, the method further includes the following step.

Step S304: The electronic device detects whether the external object satisfies a second preset condition.

If the electronic device has detected that the external object satisfies the second preset condition, the electronic device returns to step S303 to maintain display of the second image. If the electronic device has not detected that the external object satisfies the second preset condition, the electronic device returns to step S301 to end display of the second image and resume display of the first image. The electronic device may repeat the foregoing steps until the electronic device exits the always-on-display state.

The second preset condition may be the same as the first preset condition or different from the first preset condition.

It can be understood that, when the second image is a motion video, the maintaining display of the second image may be maintaining display of the last frame image of the motion video or repeatedly playing the motion video.

Optionally, when display of the second image is ended and display of the first image is resumed, the electronic device may display a transition image for linking the second image with the first image. The transition image may be a still image or a motion video.

It can be understood that when the second image is a motion video, the transition image for linking the first image with the second image is a transition image linking the last frame image of the motion video with the first image, and the last frame image of the motion video is different from the first image.

Optionally, when entering always-on-display, the electronic device may display an initial image for linking display of the first image.

For example, before step 301, the method may further include step 300: displaying an initial image. The initial image may be a still image or a motion video. For example, when switching from a lock screen to an always-on-display screen, the electronic device may display an initial image for linking the screen-lock screen with the first image. For another example, when switching from a lock screen to an always-on-display screen, the electronic device may display an initial image for linking a wallpaper screen with the first image.

In this embodiment, the always-on-display screen displayed by the electronic device can change according to the external object. When the external object satisfies a preset condition, a corresponding image or motion video is displayed, so that the always-on-display screen can be flexibly displayed.

The following describes the foregoing method in detail by using specific examples.

FIG. 4A to FIG. 4E show screens of always-on-display setting according to an embodiment of this application. As shown in FIG. 4A, a screen 401 is an always-on-display settings screen which displays an image of a virtual astronaut, indicating that a currently set first display object is the virtual astronaut. A user may select one or more interactive modes from an interactive mode list 402. The electronic device may determine a first display object according to the interactive mode(s) selected by the user. For example, when the user selects gazing at screen or tapping screen, the electronic device may determine that the first display object corresponding to the interactive mode(s) is a virtual deer. Optionally, as shown in FIG. 4B to FIG. 4D, the electronic device may display a preview screen (for example, screens 403 to 405) of the always-on-display screen, so that the user can view a display effect. In response to an operation of the user tapping a confirm control (for example, an icon 406 in the preview screen), the electronic device changes the first display object. In this case, as shown in FIG. 4E, the image of the virtual astronaut displayed in the always-on-display settings screen (screen 407) is updated to an image of the virtual deer.

Example 1: Display Object Being the Virtual Deer

As shown in FIG. 5A to FIG. 5C, when the electronic device enters always-on-display, the electronic device may display an initial image linked to the first image. As shown in screens 501 to 503, the electronic device displays an initial image of the virtual deer walking towards the center of a forest.

As shown in FIG. 6A, the electronic device displays a screen 601, and the screen 601 includes a first image (for example, image 602) of the virtual deer. The electronic device obtains an image captured by a camera. The camera may be a low-power camera installed on the electronic device. The electronic device determines whether the captured image includes a face image. As shown in FIG. 6B, if the captured image includes a face image, it means that the user is gazing at the screen of the electronic device, in which case the external object satisfies the first preset condition. Therefore, as shown in FIG. 6C to FIG. 6F, the electronic device displays a second image of the virtual deer. As shown in screens 603 to 606, the electronic device displays a motion video in which the head of the virtual deer turns from a first direction to a second direction and from the second direction back to the first direction. The first direction may be a direction of the head of the virtual deer in the first image, for example, toward the left side of the display. The second direction may be a preset direction, for example, toward the front of the display.

Optionally, the electronic device may determine whether to end display of the second image, according to whether or not it is detected that the external object satisfies the second preset condition.

For example, the second preset condition may be that user gazing at the electronic screen. That is, the second preset condition is the same as the first preset condition. How it is detected whether a user is gazing at the screen of the electronic device can be learned from the foregoing description, which is not repeated herein. If the external object satisfies the second preset condition, display of the second image is maintained, and a motion video from the screens 603 to 606 is displayed; if the external object does not satisfy the second preset condition, display of the first image (for example, image 602) of the virtual deer is resumed.

Different from the example in FIGS. 6A-6F where the last frame image (shown in the screen 606) of the motion video is the same as the first image (shown in the screen 606), the example in FIGS. 7A-7F is used to illustrate always-on-display where the last frame image (the screen 605) of the motion video is different from the second image.

Specifically, if the external object satisfies the first preset condition, as shown in the screens 603 and 604 in FIG. 7C and FIG. 7D, the electronic device displays the second image that the head of the virtual deer is turning from the first direction to the second direction. In this case, as shown in FIG. 7A and FIG. 7D, the last frame image (as shown in the screen 604) of the second image is different from the first image (as shown in the screen 602). As shown in FIG. 7E and FIG. 7F, in response to the case that the external object does not satisfy the second preset condition, the electronic device may display a transition image for linking the first image and the second image. As shown in the screens 605 and 606, a transition image that the head of the virtual deer turns from the second direction back to the first direction is displayed.

Different from the examples in FIGS. 6A-6F and FIGS. 7A-7F where, after the second image is displayed, the motion video is played repeatedly to maintain display of the second image, in response to the case that the external object satisfies the second preset condition, the example in FIGS. 8A-8F is used to illustrate that display of the second image may alternatively be maintained by continuously displaying the last frame image of the second image.

Specifically, as shown in FIG. 8D, the electronic device displays an image 607 to maintain display of the second image until the electronic device detects that the second preset condition is not satisfied.

It can be understood that the first display object in Example 1 is not limited to the virtual deer but may alternatively be other objects.

It should be noted that the examples in FIGS. 6A-6F to FIGS. 8A-8F are described by taking the second direction as a preset direction. It can be understood that the second direction may alternatively be determined according to a direction of a gaze position of the user on the screen. For example, when the user gazes at a first position on the screen, the second direction may be a direction towards the first position. Therefore, the always-on-display screen can present more changes, so that the always-on-display screen is displayed more flexibly.

For example, the electronic device may obtain a gaze position of the user on the screen, by using an eye tracking apparatus provided in the electronic device. The eye tracking apparatus may include an infrared component and a camera. The infrared component emits infrared light to the eyeball, the eyeball reflects the infrared light, the camera captures the reflected infrared light, and the electronic apparatus analyzes a captured image to determine the gaze position of the user on the screen.

It should be noted that the examples shown in FIGS. 6A-6F to FIGS. 8A-8F are described with the first preset condition and second preset condition being user gazing at screen. It can be understood that the first preset condition and the second preset condition are not limited to this. For example, as shown in FIGS. 9A-9E to FIGS. 11A-11E, the first preset condition and the second preset condition may be user tapping screen.

After the electronic device enters always-on-display, as shown in FIG. 9A, the electronic device displays a screen

601 which includes a first image 602 of the virtual deer. If the electronic device has detected that the user taps the screen, meaning that the external object satisfies the first preset condition, the electronic device displays a second image of the virtual deer as shown in FIG. 9C to FIG. 9E. As shown in screens 901 to 904, the electronic device displays a motion video of the virtual deer being updated from a first posture to a second posture and then changed from the second posture back to the first posture.

The first posture may be a posture of the virtual deer in the first image, for example, the head of the virtual deer facing the left side of the display with all legs standing; and the second posture may be a preset posture, for example, the virtual deer raises up its head facing the upper side of the screen with one front leg raised.

As shown in the figure, after the electronic device displays the second image, if the electronic device has detected within a preset period that the user taps the screen, meaning the external object satisfies the second preset condition, display of the second image is maintained; if the electronic device has not detected within the preset period that the user taps the screen, meaning the external object does not satisfy the second preset condition, display of the first image 602 of the virtual deer is resumed.

Figures 10A, 10B, 10C:
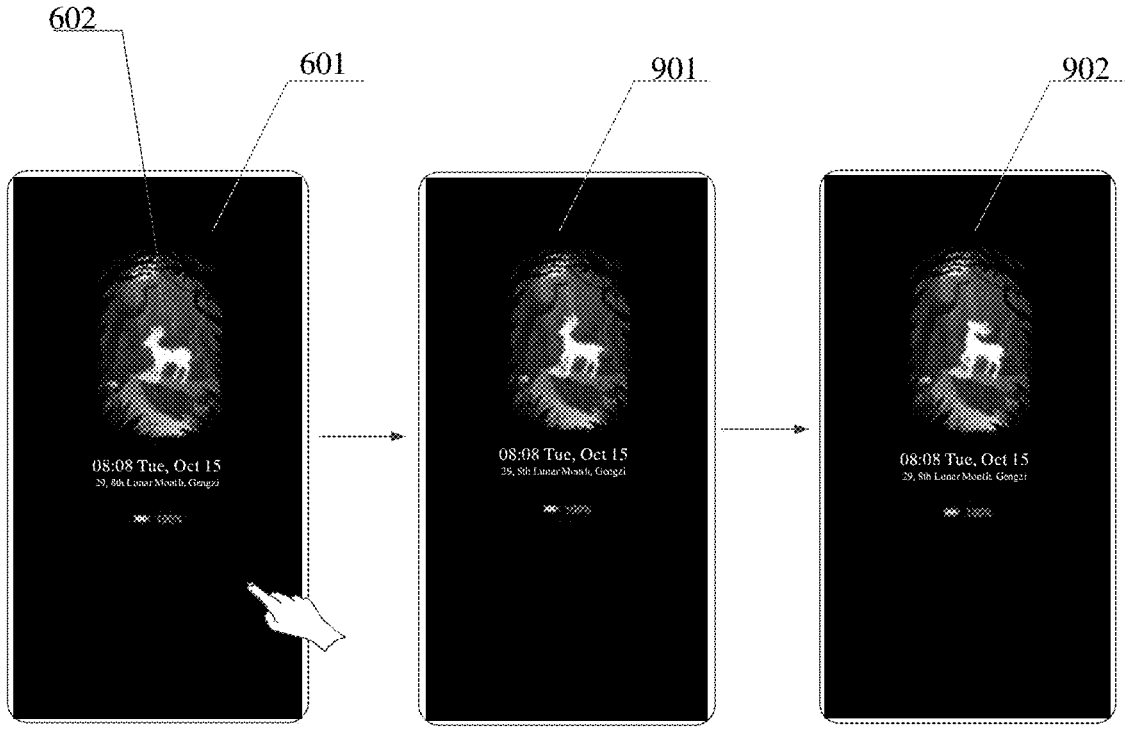
FIG. 10A to FIG. 10E are a fifth schematic diagram of changing of an always-on-display screen according to an embodiment of this application.
Figures 10D, 10E:
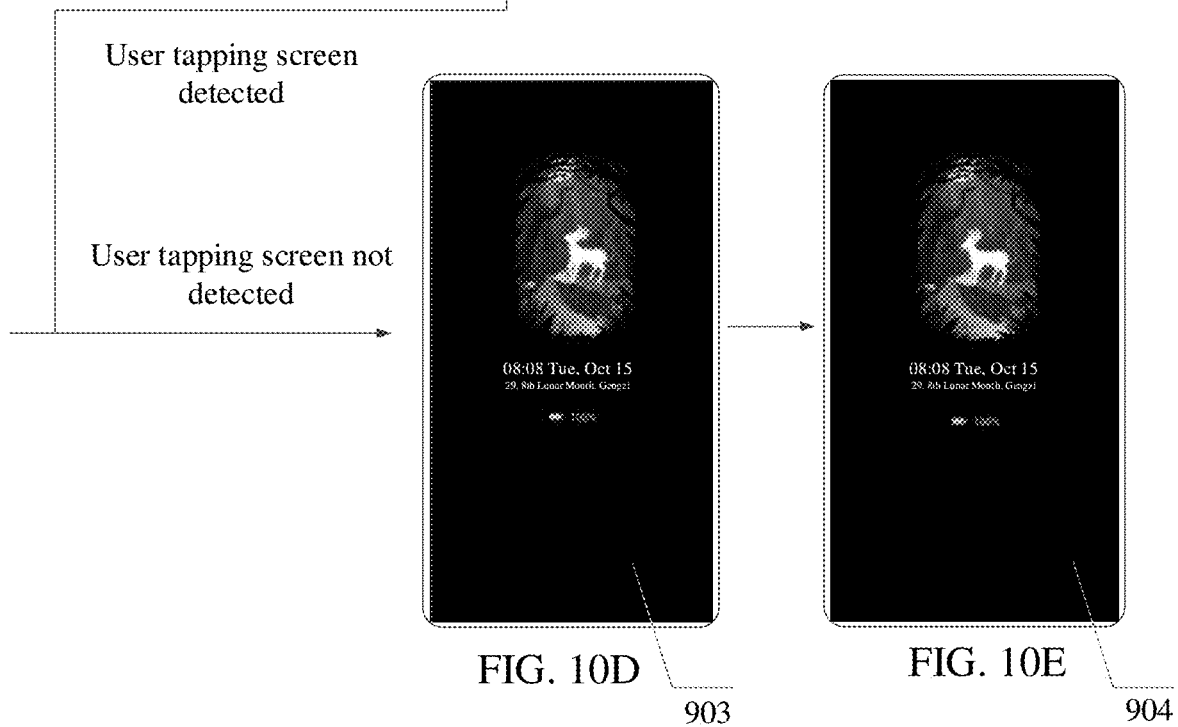

Similar to the example shown in FIGS. 7A-7F, the electronic device may display a transition image for linking the second image with the first image as shown in FIG. 10D and FIG. 10E. Specifically, a posture of the virtual deer in the first image is the first posture, and the second image is a motion video of the virtual deer changing from the first posture to the second posture. As shown in screens 903 and 904, the electronic device may display a transition image of the virtual deer changing from the second posture back to the first posture.

Similar to the example shown in FIGS. 8A-8F, as shown in FIG. 11A to FIG. 11E, after displaying the second image, if the electronic device has detected that the second preset condition is satisfied, the electronic device displays an image 905 until the second preset condition is not satisfied, and then the electronic device resumes display of the image 602. For detailed description, refer to the foregoing content, which is not repeated herein.

Optionally, the second posture may be associated with strength with which the user taps the screen. Specifically, the electronic device measures the strength with which the user taps the screen, and determines the second posture according to the strength. For example, a greater strength makes greater difference between the second posture and the first posture, or makes greater variation of the second posture relative to the first posture.

It can be understood that one display object may correspond to one preset condition, and may also correspond to a plurality of preset conditions. For example, a virtual deer may correspond to two preset conditions: (1) gazing at screen and (2) tapping screen.

It should be noted that this embodiment is described with a virtual deer being an example of the display object, but it can be understood that the display object is not limited to this. For example, the display object may be a virtual astronaut, a virtual bird, a virtual feather, or the like, which is not limited in this embodiment. Different display objects may correspond to the same or different preset conditions.

Example 2

As shown in FIGS. 12A-12E, the display object is a virtual astronaut. The first preset condition and the second preset condition are detection of a hand waving action.

The electronic device obtains an image captured by the camera, and determines whether a hand waving action is detected according to the captured image. If a hand waving action is detected, the electronic device displays a second image of the virtual astronaut, as shown in FIG. 12C to FIG. 12E. In this case, the second image may be a motion video of the virtual astronaut waving. For details, refer to the foregoing description, which is not repeated herein.

Optionally, the electronic device may determine the second image to be displayed according to a hand waving speed of the user. Specifically, the electronic device identifies the hand waving speed of the user based on the captured image, and determines a waving speed of the virtual astronaut according to the hand waving speed of the user. For example, a higher waving speed of the user corresponds to a higher frame rate of the second image and a faster waving speed of the virtual astronaut. Conversely, a slower waving speed of the user corresponds to a lower frame rate of the second image and a slower waving speed of the virtual astronaut.

It can be understood that use waving has been used as an example for description without limiting the preset conditions which may alternatively be, for example, nodding, shaking the head, turning the head, making an OK gesture, making a scissor hand gesture, making a smiling face, making a crying face, making a surprised face, or the like. Different preset conditions may correspond to different second images. When the preset condition is nodding, the electronic device may determine a frame rate of display of the second image according to a nodding speed. For example, a higher nodding speed corresponds to a higher frame rate of the second image and a faster nodding speed of the virtual astronaut. Conversely, a slower nodding speed of the user corresponds to a lower frame rate of the second image and a slower nodding speed of the virtual astronaut.

The foregoing examples are described with the first preset condition and the second preset condition being the same. The following uses Example 3 to describe a scenario in which the first preset condition and the second preset condition are different.

Example 3

As shown in FIGS. 13A-13F, the display object is a virtual bird. The first preset condition is detection of a distance between the user and the electronic device being less than or equal to a first preset distance. The electronic device may determine a first distance between the external object and the electronic device through a distance sensor. If the first distance between the external object and the electronic device is less than or equal to the first preset distance, a motion video of the virtual bird flying out of the screen is displayed. The second preset condition is detection of a distance between the user and the electronic device being greater than a second preset distance. If the first distance between the external object and the electronic device is greater than the second preset distance, a motion video of the virtual bird flying into the screen is displayed. The first preset distance and the second preset distance may be the same or different.

Optionally, the electronic device may determine an approaching direction of the external object, and determine a flying direction of the virtual bird according to the approaching direction of the external object. For example, the external object approaches the electronic device toward the front left of the screen, and the electronic device displays the second image of the virtual bird flying out of the screen from the left side of the screen.

Example 4

As shown in FIGS. 14A-14D, the display object is a virtual feather. The first preset condition and the second preset condition are user shaking the electronic device.

The electronic device may obtain an acceleration of the electronic device through an acceleration sensor, and determine a shaking frequency of the electronic device based on the acceleration. If a first shaking frequency is greater than a preset shaking frequency, it is considered that the user is shaking the electronic device, meaning that the external object satisfies the first preset condition or the second preset condition. As shown in screens 1401 to 1403, the electronic device may display the second image of the virtual feather floating on the screen.

Optionally, to prevent pixels in the display from malfunctioning due to long-time stay in a normally on state, when the second image is displayed, pixels that are lit when the first image is displayed can be inhibited from being lit. Display positions of the display objects may be different. For example, referring to FIG. 15A and FIG. 15B, filled pixels in FIG. 15A are pixels that are lit to display the virtual feather which is still; and filled pixels in FIG. 15B are pixels that are lit to display the virtual feather which is floating. The pixels lit when the second image is displayed are different from the pixels lit when the first image is displayed.

Optionally, the electronic device further determines the floating speed of the virtual feather displayed, according to the shaking frequency of the electronic device. For details, refer to the foregoing content, which is not repeated herein.

It should be noted that Examples 1 to 4 are described by using a user as the external object, and it can be understood that the external object may alternatively be an electronic device.

Example 5

As shown in FIGS. 16A-16C, the display object is time information, and the first preset condition and the second preset condition are an external device such as a watch being connected to the electronic device.

Specifically, after the electronic device enters always-on-display, as shown in FIG. 16B, the electronic device displays a screen 1601 which includes time information: "08:08", "Tue, October 15" and "29, 8th Lunar Month, Gengzi". It can be understood that time information for displaying a current time and power information for displaying remaining power may vary with the elapse of the time and the change of the remaining power. At this point, a display style of time on the screen 1601 is style A.

If it is detected that a watch is connected to the mobile phone, meaning that the external object satisfies the first preset condition, the electronic device displays the second image. The second image may be determined according to a time display style of the watch.

Specifically, in response to detecting that the first preset condition is satisfied, the electronic device obtains display style information of the watch, where the display style information of the watch is used to characterize a display style (for example, style B) of the watch. The electronic device determines to display time in style B based on this information. That is, the second image includes time displayed in style B. It can be understood that, as shown in FIGS. 17A-17C, if the display style of the watch is style C, the second image of the electronic device may include time displayed in style C.

Figures 18A, 18B, 18C:
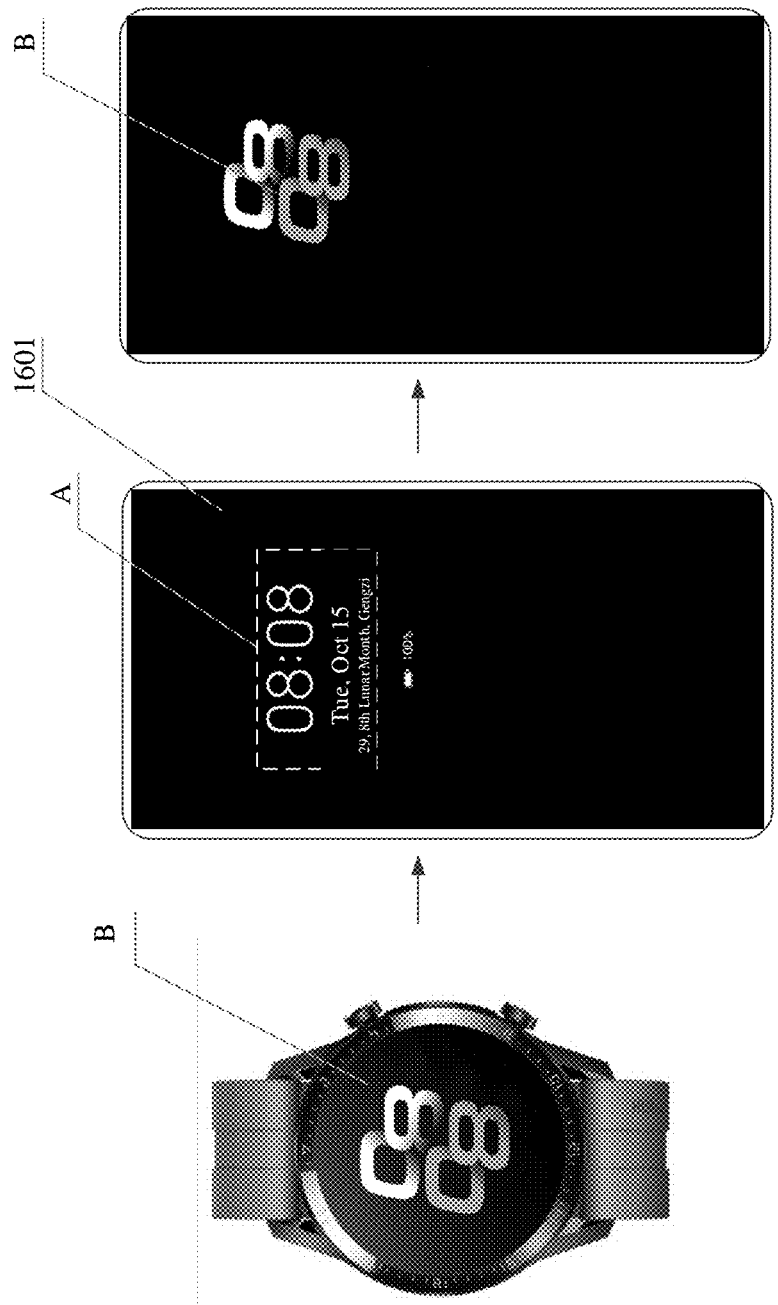
FIG. 18A to FIG. 18C are a twelfth schematic diagram of changing of an always-on-display screen according to an embodiment of this application.

It should be noted that, as shown in FIGS. 18A-18C, when time is displayed in style B, other information such as date and remaining power may not be displayed.

It should be noted that, in Examples 1 to 5, the display objects of the first image and the second image are the same display object. It can be understood that the display objects of the first image and the second image may alternatively be different. The following gives description by using Example 6.

Example 6

After the electronic device enters always-on-display, as shown in FIG. 19B, the electronic device displays a screen 1601, and the electronic device displays a first image (for example, image 1901) of a first display object.

If an external object satisfies a first preset condition, the electronic device displays a second image (for example, image 1902) which includes a second display object. As shown in the screen 1601 and a screen 1903, the second display object, which is a virtual heart, is different from the first display object.

Optionally, the electronic device may determine the second image according to heart rate information detected by a watch. Specifically, the electronic device receives the heart rate information sent by the watch, and generates the second image according to the heart rate information, where the second image is a motion video of the virtual heart beating. A beating frequency of the heart in the second image and a waveform displaying a heart rate curve may be determined according to the heart rate information.

It can be understood that the external device is not limited to the watch or sports bracelet in Examples 5 and 6, but may alternatively be other external devices. The information received by the electronic device and sent by the external device is also not limited to the heart rate in the examples, but may alternatively be other biological information, weather information, or location information. The other biological information may include, but is not limited to, at least one of the following: calories and number of steps. The weather information may include, but is not limited to, at least one of the following: temperature and weather. The weather is, for example, light rain, sunny, cloudy, or heavy snow. For example, when the information is the number of steps of the user, the second display object may be a virtual user, and the second image of the second display object may be a motion video of the virtual user running. For another example, when the information is weather information, the second display object may be an object used to represent weather information. For example, when the weather information indicates that the current weather is light rain, the second display object may be a virtual raindrop, and the second image may be a motion video of the virtual raindrop dropping.

The foregoing has described the charging method provided in the embodiments of this application. The following is to describe an apparatus provided in the embodiments of this application.

Figure 20:
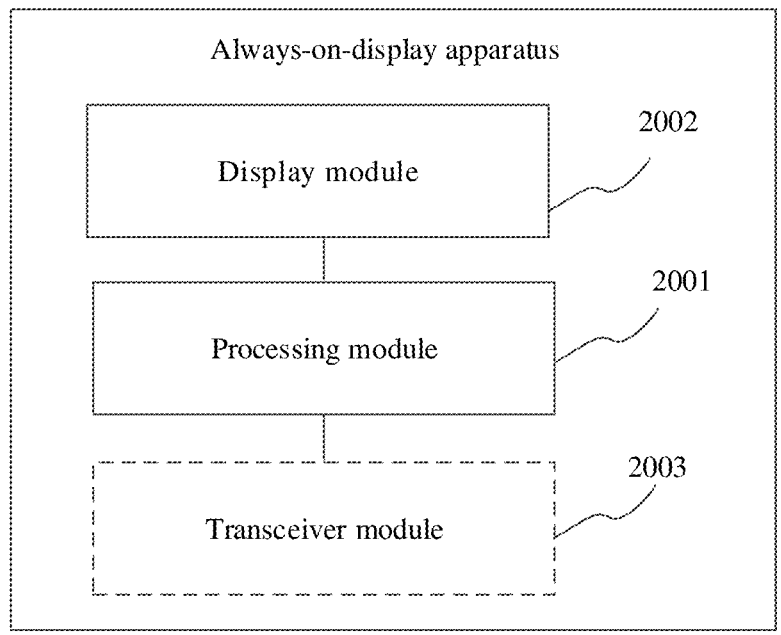
FIG. 20 is a schematic structural diagram of an always-on-display apparatus according to an embodiment of this application.

FIG. 20 is a schematic structural diagram of an always-on-display apparatus according to an embodiment of this application. Referring to FIG. 20, the charging apparatus includes: a processing module 2001 and a display module 2002.

The display module 2002 is applied to an always-on-display screen. The always-on-display screen includes a first image of a first display object; in response to detecting by the processing module 2001 that an external object satisfies a first preset condition, the display module 2001 is configured to display a second image of a second display object, where the second image is different from the first image.

Optionally, after the display module 2001 displays the second image, the processing module 2001 is further configured to: maintain display of the second image if it has been detected that the external object satisfies a second preset condition; and resume display of the first image if it has not been detected that the external object satisfies a second preset condition.

Optionally, when the second image is a motion video, the processing module 2001 is specifically configured to maintain display of the last frame image of the motion video.

Optionally, before the processing module 2001 resumes display of the first image, the display module 2002 is further configured to display a transition image for linking the second image with the first image.

Optionally, before the display module 2002 displays the first image, the display module 2002 is further configured to display an initial image, where the initial image is used for linking display of the first image.

Optionally, the first preset condition and the second preset condition include one or more of the following: user waving, nodding, shaking the head, gazing at screen of the always-on-display apparatus, tapping screen of the always-on-display apparatus, or shaking the always-on-display apparatus, or an external device being connected.

Optionally, before the display module 2002 displays the second image of the second display object, the processing module 2001 is further configured to: obtain information about the external object, and determine a display parameter of the second image based on the information about the external object; and the display module 2002 is specifically configured to display the second image according to the display parameter.

Optionally, the display parameter of the second image includes one or more of the following: a header orientation parameter of the second display object in the second image, a posture parameter of the second display object in the second image, a display frame rate of the second image, a display position parameter of the second display object in the second image, a style of the second display object in the second image, and a waveform parameter of the second display object in the second image.

Optionally, the first display object is the same as the second display object; or the first display object is different from the second display object.

Optionally, the first preset condition is the same as the second preset condition, or the first preset condition is different from the second preset condition.

Optionally, the apparatus further includes a transceiver module 2003. The first preset condition is an external device being connected, and the processing module 2001 is specifically configured to: receive information sent by the external device via the transceiver module 2003; and display the second image of the second display object according to the information via the display module 2002.

Optionally, when the first preset condition is an external device being connected, and the information about the external object includes biological information sent by the external device, the processing module 2001 is specifically configured to determine a display frame rate of the second image based on the biological information; and the display module 2002 is specifically configured to display the second image at the display frame rate.

Optionally, when the first preset condition is an external device being connected, and the information about the external object includes style information sent by the external device, the processing module 2001 is specifically configured to determine a style of the second display object based on the style information; and the display module 2002 is specifically configured to display the second display object in the style, where the second image includes the second display object displayed in the style.

Optionally, the processing module 2001 is further configured to: obtain an interactive mode selection instruction input by a user, and determine the first display object matching the interactive mode according to the interactive mode selection instruction.

The charging apparatus in this embodiment can implement the technical solutions shown in the foregoing method embodiments, with similar implementation principles and beneficial effects, which are not repeated herein.

Figure 21:
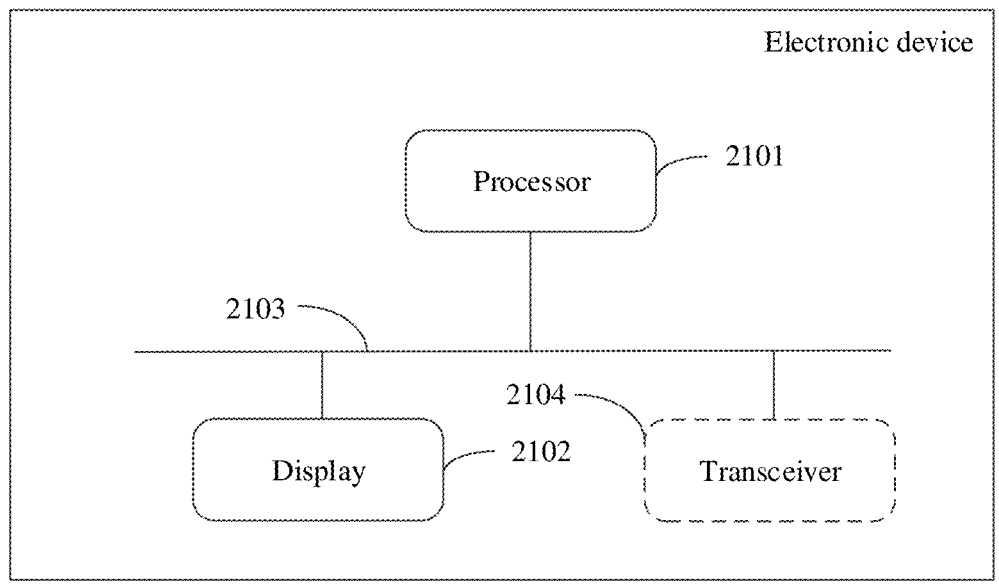
FIG. 21 is a schematic structural diagram of an electronic device according to an embodiment of this application.

FIG. 21 is a schematic structural diagram of a terminal device according to an embodiment of this application. Referring to FIG. 21, the terminal device in this embodiment may include: a processor 2101 and a display 2102, where the processor 2101 and the display 2102 may communicate with each other through a communications bus 2103.

The display 2101 is applied to display an always-on-display screen. The always-on-display screen includes a first image of a first display object; in response to detecting by the processor 2101 that an external object satisfies a first preset condition, the display 2001 is configured to display a second image of a second display object, where the second image is different from the first image.

Optionally, after the display 2102 displays the second image, the processor 2101 is further configured to: maintain display of the second image if it has been detected that the external object satisfies a second preset condition; and resume display of the first image if it has not been detected that the external object satisfies a second preset condition.

Optionally, the second image is a motion video, and the processor 2101 is specifically configured to maintain display of the last frame image of the motion video.

Optionally, before the processor 2101 resumes display of the first image, the display 2102 is further configured to display a transition image for linking the second image with the first image.

Optionally, before the display 2102 displays the first image, the display 2102 is further configured to display an initial image, where the initial image is used for linking display of the first image.

Optionally, the first preset condition and the second preset condition include one or more of the following: user waving, nodding, shaking the head, gazing at screen of the always-on-display apparatus, tapping screen of the always-on-display apparatus, or shaking the always-on-display apparatus, or an external device being connected.

Optionally, before the display 2102 displays the second image of the second display object, the processor 2101 is further configured to: obtain information about the external object, and determine a display parameter of the second image based on the information about the external object; and the display 2102 is specifically configured to display the second image according to the display parameter.

Optionally, the display parameter of the second image includes one or more of the following: a header orientation parameter of the second display object in the second image, a posture parameter of the second display object in the second image, a display frame rate of the second image, a display position parameter of the second display object in the second image, a style of the second display object in the second image, and a waveform parameter of the second display object in the second image.

Optionally, the first display object is the same as the second display object; or the first display object is different from the second display object.

Optionally, the first preset condition is the same as the second preset condition, or the first preset condition is different from the second preset condition.

Optionally, the apparatus further includes a transceiver 2103. The first preset condition is an external device being connected, and the processor 2101 is specifically configured to: receive information sent by the external device via the transceiver 2104; and display the second image of the second display object according to the information via the display 2102.

Optionally, when the first preset condition is an external device being connected, and the information about the external object includes biological information sent by the external device, the processor 2101 is specifically configured to determine a display frame rate of the second image based on the biological information; and the display 2102 is specifically configured to display the second image at the display frame rate.

Optionally, when the first preset condition is an external device being connected, and the information about the external object includes style information sent by the external device, the processor 2101 is specifically configured to determine a style of the second display object based on the style information; and the display 2102 is specifically configured to display the second display object in the style, where the second image includes the second display object displayed in the style.

Optionally, the processor 2101 is further configured to: obtain an interactive mode selection instruction input by a user, and determine the first display object matching the interactive mode according to the interactive mode selection instruction.

The electronic device in this embodiment can implement the technical solutions shown in the foregoing method embodiments, with similar implementation principles and beneficial effects, which are not repeated herein.

An embodiment of this application further provides a non-transitory computer-readable storage medium storing a computer instruction, where the storage medium is configured to store a computer program, and the computer program is used to implement the always-on-display method described in the foregoing embodiments.

An embodiment of this application further provides a computer program product, where the computer program product includes an instruction, and when the instruction is executed, a computer is enabled to execute the always-on-display method described in the foregoing embodiments.

In addition, an embodiment of this application further provides a graphical user interface (graphical user interface, GUI) on an electronic device, where the graphical user interface specifically includes the graphical user interface displayed by the electronic device when the foregoing method embodiments are executed.

An embodiment of this application provides a chip. The chip is configured to support an electronic device in implementing the functions demonstrated in the embodiments of this application. The chip is specifically applied to a chip system which may include a chip or include a chip and other discrete devices. When the foregoing method is implemented by a chip inside an electronic device, the chip includes a processing unit. Further, the chip may further include a communications unit, and the processing unit may be, for example, a processor. When the chip includes a communications unit, the communications unit may be, for example, an input/output interface, a pin, or a circuit. The processing unit executes all or some of the actions performed by the processing module in the embodiments of this application, and the communications unit may execute corresponding receiving or sending actions. In another specific embodiment, the processing module of the electronic device in this application may be a processing unit of a chip.

All or some of the steps for implementing the foregoing method embodiments may be completed by a program instructing relevant hardware. The program may be stored in a readable memory. When the program is executed, the steps in the method embodiments are executed; and the memory (storage medium) includes: a read-only memory (read-only memory, ROM), a RAM, a flash memory, a hard disk, a solid-state hard disk, a magnetic tape (magnetic tape), a floppy disk (floppy disk), an optical disc (optical disc), or any combination thereof.

The embodiments of this application are described with reference to the flowcharts and/or block diagrams of the method, device (system), and computer program product according to the embodiments of this application. It should be understood that computer program instructions may be used to implement each process and/or each block in the flowcharts and/or the block diagrams, or a combination of processes and/or blocks in the flowcharts and/or the block diagrams. These computer program instructions may be provided to a general-purpose computer, a special-purpose computer, an embedded processor, or a processing unit of any other programmable data processing device to produce a machine, such that the instructions, which are executed by the processing unit of the computer or any other programmable data processing device, create means for implementing a specific function in one or more processes in the flowcharts and/or in one or more blocks in the block diagrams.

These computer program instructions may be stored in a computer-readable memory that can direct the computer or any other programmable data processing device to function in a particular manner, such that the instructions stored in the computer-readable memory create an article of manufacture including an instruction apparatus which implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of this application. This application is intended to cover these modifications and variations provided that they fall within the scope of protection defined by the following claims and their equivalent technologies of this application.

In this application, the term "include" and its variants may mean non-limiting inclusion; and the term "or" and its variants may mean "and/or". The terms "first", "second", and the like in this application are used to distinguish between similar objects instead of describing a specific order or sequence. In this application, "a plurality of" means two or more than two. "And/or" describes an association relationship of associated objects and represents that three relationships may exist. For example, A and/or B may represent the following three cases: only A, both A and B, and only B. The character "/" generally indicates an "or" relationship between the associated objects before and after the character.

What is claimed is:

1. An electronic device, comprising:
    a touchscreen;
    a memory;
    a display; and
    one or more processors, wherein the touchscreen, the memory, and the display are coupled to the processor, the memory stores computer program code, the computer program code comprises computer instructions, and when the computer instructions are executed by the processor, the electronic device is enabled to perform following operations:
    displaying an always-on-display screen, wherein the always-on-display screen comprises a first image of a first display object;
    in response to a first operation of a user gazing at a screen of the electronic device, displaying a second image of the first display object on the always-on-display screen, wherein the second image shows the first display object different from the first image, and the second image is a motion video or a still image; and
    in response to a second operation of a user tapping the screen of the electronic device, displaying a third image of the first display object on the always-on-display screen, wherein the third image shows the first display object different from the first image.

2. The electronic device according to claim 1, wherein the second image is continuous in content with the first image, and the third image is continuous in content with the first image.

3. The electronic device according to claim 1, wherein the second image is a first motion video, the third image is a second motion video, and the first motion video is different from the second motion video.

4. The electronic device according to claim 3, wherein the last frame of the first motion video is the same as the last frame of the second motion video.

5. The electronic device according to claim 1, wherein after displaying the second image of the first display object on the always-on-display screen, the electronic device is enabled to further perform following operations:
    in response to constantly inputting the first operation by the user, maintaining, displaying of the second image on the always-on-display screen.

6. The electronic device according to claim 1, wherein after displaying the second image of the first display object on the always-on-display screen, the electronic device is enabled to further perform following operations:
    in response to stopping the first operation by the user, ending, displaying of the second image on the always-on-display screen, and resuming, displaying of the first image on the always-on-display screen.

7. The electronic device according to claim 1, wherein the electronic device is enabled to further perform following operations:
    in response to the first operation ending, resuming displaying of the first image on the always-on-display screen; and
    in response to continuation of the first operation, repeating displaying of the second image on the always-on-display screen.

8. The electronic device according to claim 1, wherein the electronic device is enabled to further perform following operations:
    in response to the first operation ending, resuming displaying of the first image on the always-on-display screen; and
    in response to the continuation of the first operation, continuously displaying a last frame of the second image on the always-on-display screen.

9. The electronic device according to claim 1, wherein the always-on-display screen is displayed with the first display object in a changeable position.

10. The electronic device according to claim 1, wherein an image on the always-on-display screen is displayed by lighting up some of pixels in the screen of the electronic device.

11. The electronic device according to claim 1, wherein the always-on-display screen comprises one or more of the following information: time, date, or battery power.

12. The electronic device according to claim 1, wherein the electronic device comprises a camera.

13. The electronic device according to claim 12, wherein the electronic device further comprises an infrared component.

14. The electronic device according to claim 12, wherein the electronic device is enabled to further perform following operations:
    capturing, an image captured by the camera;
    when the captured image comprises a face image, determining, to display the second image of the first display object on the always-on-display screen.

15. The electronic device according to claim 1, wherein the electronic device is enabled to further perform following operations:
    displaying, a first settings screen, wherein the first settings screen comprises a first option, and the first option indicates an interactive mode of the always-on-display screen is enabled when a user gazing at the screen of the electronic device or tapping the screen of the electronic device.

16. The electronic device according to claim 1, wherein the electronic device is enabled to further perform following operations:
    displaying, a second settings screen, wherein the second settings screen comprises a preview of at least one of the first image, the second image and the third image of the first display object.

17. The electronic device according to claim 1, wherein the first display object is a virtual object, and the virtual object comprises one or more of a virtual deer, a virtual astronaut, a virtual feather, a virtual bird, or a virtual user.

18. An always-on-display method, comprising:
    displaying, by an electronic device, an always-on-display screen, wherein the always-on-display screen comprises a first image of a first display object;
    in response to a first operation of a user gazing at a screen of the electronic device, displaying, by the electronic device, a second image of the first display object on the always-on-display screen, wherein the second image shows the first display object different from the first image, and the second image is a motion video or a still image; and in response to a second operation of a user tapping the screen of the electronic device, displaying, by the electronic device, a third image of the first display object on the always-on-display screen, wherein the third image shows the first display object different from the first image.

19. The method according to claim 18, wherein the second image is continuous in content with the first image, and the third image is continuous in content with the first image.

20. A non-transitory computer-readable storage medium storing computer instructions, wherein when the computer instructions are run on an electronic device, the electronic device is enabled to perform following operations:

displaying an always-on-display screen, wherein the always-on-display screen comprises a first image of a first display object;

in response to a first operation of a user gazing at a screen of the electronic device, displaying a second image of the first display object on the always-on-display screen, wherein the second image shows the first display object different from the first image, and the second image is a motion video or a still image; and in response to a second operation of a user tapping the screen of the electronic device, displaying a third image of the first display object on the always-on-display screen, wherein the third image shows the first display object different from the first image.

* * * * *